(12) United States Patent
Canright et al.

(10) Patent No.: US 11,746,219 B2
(45) Date of Patent: Sep. 5, 2023

(54) BLENDS OF RECYCLED RESINS WITH METALLOCENE-CATALYZED POLYOLEFINS

(71) Applicant: ExxonMobil Chemical Patents Inc., Baytown, TX (US)

(72) Inventors: Robert M. Canright, Huffman, TX (US); James A. Stern, Spring, TX (US); Kelsey L. Terrill, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/661,958

(22) Filed: May 4, 2022

(65) Prior Publication Data

US 2022/0259417 A1 Aug. 18, 2022

Related U.S. Application Data

(60) Provisional application No. 63/362,580, filed on Apr. 6, 2022.

(51) Int. Cl.
*C08L 23/06* (2006.01)

(52) U.S. Cl.
CPC ......... *C08L 23/06* (2013.01); *C08L 2205/025* (2013.01); *C08L 2205/03* (2013.01); *C08L 2207/066* (2013.01); *C08L 2207/20* (2013.01)

(58) Field of Classification Search
CPC .. C08L 23/06; C08L 23/0815; C08L 2207/20; C08L 2205/025
See application file for complete search history.

(56) References Cited

U.S. PATENT DOCUMENTS

| | | | |
|---|---|---|---|
| 5,534,317 A * | 7/1996 | Herman | C08J 11/06 206/524.1 |
| 5,601,891 A | 2/1997 | Herman et al. | |
| 5,693,391 A | 12/1997 | Herman et al. | |
| 5,908,677 A | 6/1999 | Hiltner et al. | |
| 10,053,563 B2 | 8/2018 | Trolez et al. | |

(Continued)

FOREIGN PATENT DOCUMENTS

| | | | | |
|---|---|---|---|---|
| CN | 107880496 A * | 4/2018 | ............... | C08J 5/18 |
| EP | 340666 A1 | 11/1989 | | |
| EP | 3074464 B1 * | 4/2017 | ............. | C08J 3/005 |

(Continued)

OTHER PUBLICATIONS

Kosior et al. SPE/ANTEC 1999 Proceedings, p. 1769, (Year: 1999).*

*Primary Examiner* — Mark S Kaucher
(74) *Attorney, Agent, or Firm* — ExxonMobil Technology and Engineering Company-Chem

(57) ABSTRACT

A recycled resin composition with significantly improved stress crack resistance and impact properties with minimal loss of stiffness. The recycled resin composition is a blend of at least one recycled resin (PCR and/or PIR), at least one virgin high density polyethylene and at least one virgin metallocene catalyzed linear low density polyethylene. The recycled resin composition can have a flex modulus @0.05 in/min of 110,000 psi to 180,000 psi, as measured by ASTM D790, Proc. A 1% Secant Modulus; and/or an ESCR, as measured by 100% Igepal Cond B, ASTM D1693, of about 10 hr to about 75 hr.

10 Claims, 3 Drawing Sheets

(56) References Cited

U.S. PATENT DOCUMENTS

2012/0130006 A1\* 5/2012 Van Den Bossche ..... C08J 5/18
                                                    525/240
2021/0347970 A1   11/2021 Kahlen et al.

FOREIGN PATENT DOCUMENTS

| WO |    1993-00400 A1  |    1/1993 |           |          |
|----|-------------------|-----------|-----------|----------|
| WO |  2012-0139967 A1  |   10/2012 |           |          |
| WO | WO-2015076640 A1 \* |  5/2015 | ........... | H04L 67/125 |
| WO | WO-2019240899 A1 \* | 12/2019 | .............. | C08L 23/04 |

\* cited by examiner

BLENDS OF RECYCLED RESINS WITH METALLOCENE-CATALYZED POLYOLEFINS

RELATED CASES

This application claims priority to U.S. Provisional Application No. 63/362,580, entitled Blends of Recycled Resins with Metallocene-Catalyzed Polyolefins, filed Apr. 6, 2022, the entirety of which is incorporated herein by reference.

FIELD

The present disclosure relates to recycled resins and articles made therefrom. More particularly, embodiments provided herein relate to improving properties of Post-Consumer Recycled and/or Post-Industrial Recycled resins using metallocene catalyzed polyethylenes.

BACKGROUND

Recycling plastic waste is a subject of increasing importance as are efforts to use more recycled resins (e.g., post-consumer recycled resin (PCR) or post-industrial recycled resin (PIR)). The mechanical properties of recycled resins, however, are not very good, resulting in multiple failures when used to make blow molded products, such as bottles and containers. In particular, blow molded products made from recycled resins show poor stress crack resistance (SCR). Stress crack resistance can be measured using the environmental stress crack resistance (ESCR) and/or Notched Constant Ligament-Stress (NCLS) tests, and can be particularly important for high density polyethylene (HDPE)-based applications such as pipe, molding, and other articles. This can present challenges for PCR or PIR-based resins intended for such uses where stress crack resistance is important.

To improve the mechanical properties of recycled resins, it is known to blend the post consumer recycled polymer with virgin material. WO2012/139967 describes a process for adding virgin HDPE to HDPE detergent packaging waste. EP0654496 and U.S. Pat. No. 5,693,391 also disclose adding virgin HDPE copolymer resin to a post consumer resin derived from milk bottles.

EP3074464 A1 describes a process for producing high density polyethylene composition having high environmental stress crack resistance from post-consumer plastic and articles made of said composition. EP561187 A1 discloses a blow molded container of blends of recycled high density polyethylene and linear low density polyethylene. U.S. Pat. No. 5,601,891 A discloses plastic containers made from a fusion blend of post-consumer plastic and ethylene polymers. EP340666 A1 discloses a process to improve non-homogeneous recycled polyethylene by blending with virgin polyethylene and article made from these blends. WO202070175 A1 discloses an upgraded recycled polyethylene rich polyolefin by adding a heterophasic random copolymer of a random polypropylene copolymer matrix phase and a dispersed elastomer phase.

None of these, however, provide recycled polymer resins suitable for blow molding applications with acceptable ESCR, stiffness, and impact resistance. There is still a need, therefore, for compositions and articles having enhanced mechanical properties that are made from recycled polymers.

SUMMARY

A recycled resin composition is provided herein. In at least one specific embodiment, the recycled resin composition includes at least one recycled resin, up to about 45 wt %, based on the total weight of the composition, of a virgin HDPE containing at least 99 wt % of ethylene derived units and having a density of about 0.945 g/cm3 to about 0.970 g/cm3 and a MI2 of about 0.1 to about 1.5 g/10 min, as measured by ASTM D1238 (190° C., 2.16 kg load), and greater than 0 wt % and up to about 10 wt %, based on the total weight of the composition, of at least one metallocene catalyzed linear low density polyethylene (mLLDPE) modifier that is 80 wt % to 98 wt % ethylene and 2 wt % to 20 wt % of one or more C3-C12 alpha olefins. The recycled resin composition can have one or more of the following properties: a flex modulus @ 0.05 in/min of 110,000 psi to 180,000 psi, as measured by ASTM D790, Proc. A 1% Secant Modulus and an ESCR, as measured by 100% Igepal Cond B, ASTM D1693, of about 10 hr to about 75 hr.

In one aspect, the mLLDPE that is 80 wt % to 98 wt % ethylene and 2 wt % to 20 wt % of one or more C3-C12 alpha olefins can be a first mLLDPE having a density of about 0.900 g/cm$^3$ to about 0.945 g/cm$^3$, molecular weight distribution (MWD, defined as Mw/Mn) of about 3.0 to 4.5, CDBI of 60% to 99%. The first mLLDPE can also have a melt index ratio (MIR) within the range from 25 to 40, wherein MIR is the ratio of high load melt index (HLMI, ASTM D1238 at 190° C., 21.6 kg) to melt index (MI, ASTM D1238 at 190° C., 2.16 kg); an inflection point in a Van Gurp Palmen plot of phase angle vs. complex modulus (Pa) of the polyethylene copolymer; and/or a shear thinning ratio less than 15.

In another aspect, the mLLDPE that is 80 wt % to 98 wt % ethylene and 2 wt % to 20 wt % of one or more C3-C12 alpha olefins can be a second mLLDPE having a density of about 0.900 g/cm$^3$ to about 0.940 g/cm$^3$, MWD of 2 to 4.5, CDBI of 15% to 40%, and a broad orthogonal composition distribution.

In yet another aspect, the mLLDPE that is 80 wt % to 98 wt % ethylene and 2 wt % to 20 wt % of one or more C3-C12 alpha olefins can be a third mLLDPE having a density of about 0.900 g/cm$^3$ to about 0.940 g/cm$^3$, MWD of 6 to 10, CDBI of 15 to 40%, and a broad orthogonal composition distribution.

Such recycled resin compositions exhibit significantly improve physical properties particularly useful for blow molding applications, as well as blown film/sheet solutions, such as food packaging, form fill, and seal packaging, heavy duty bags, lamination film, stand up pouches, multilayer packaging film, and shrink film.

DETAILED DESCRIPTION

Figure 1:
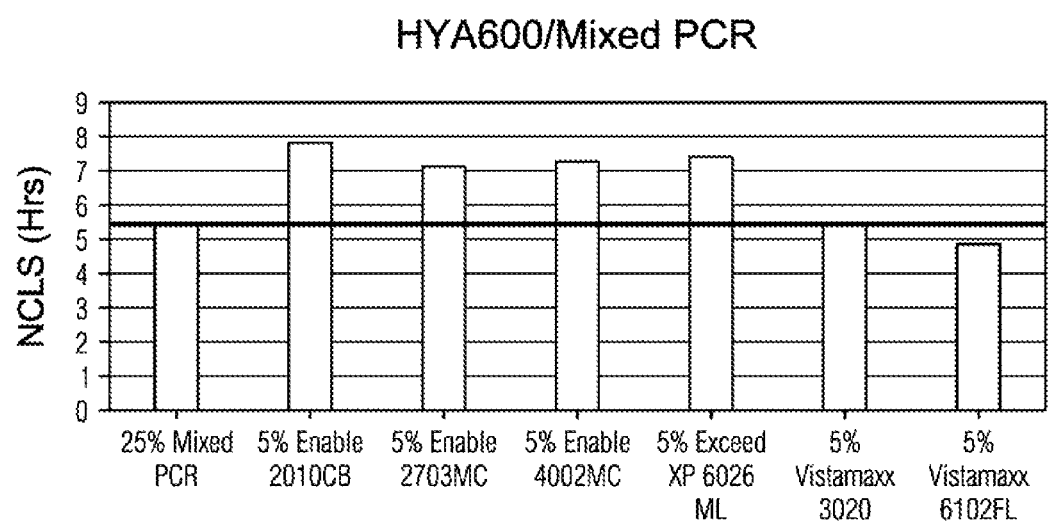
FIG. 1 shows the effect of 5 wt % mLLDPE on stress crack resistance (measured using NCLS) added to a recycled resin, according to one or more embodiments provided herein.

The present disclosure relates to improved recycled resin compositions and formulations thereof. It has been surprisingly discovered that the addition of a relatively small amount of certain polyethylenes to Post-Consumer Resins ("PCR") and/or Post-Industrial Resins ("PIR") can significantly improve physical properties for making blow molded articles therefrom. In particular, the addition of the metallocene catalyzed polyethylenes described herein provide a significant boost in the performance of recycled resins not seen before. Recycled resin blends containing up to 10 wt % of any one or more of the metallocene catalyzed polyethylenes described herein benefit from significantly improved stress crack resistance and impact properties with minimal loss of stiffness. Such recycled resin blends are particularly useful for blow molding applications, although blown film/sheet solutions are equally envisioned, such as food packaging, form fill, and seal packaging, heavy duty bags, lamination film, stand up pouches, multilayer packaging film, and shrink film, for example.

The terms "Post-Consumer Resin" and "PCR", are used interchangeably herein, and both refer to recycled products from waste created by consumers, including but not limited to domestic waste, household waste or end of life vehicle waste.

The terms "Post-Industrial Resin" and "PIR" are also used interchangeably herein, and both refer to recycled products created from scrap by manufacturers, including but not limited to, waste components from pre-consumer resins during packaging processes.

The term "recycle resin", as used herein, collectively refers to all recycled resins whether Post-Consumer Resin and/or Post-Industrial Resin.

The term "polyethylene" refers to a polymer having at least 50 wt % ethylene-derived units, such as at least 70 wt % ethylene-derived units, such as at least 80 wt % ethylene-derived units, such as at least 85 wt % or at least 90 wt % ethylene-derived units; or at least 95 or even 100 wt % ethylene-derived units. The polyethylene can thus be a homopolymer or a copolymer, including a terpolymer, having one or more other monomeric units. polyethylene described herein can, for example, include at least one or more other olefin(s) and/or comonomer(s).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically.

The term "alpha-olefin" or "α-olefin" refers to an olefin having a terminal carbon-to-carbon double bond in the structure thereof $R^1R^2C=CH_2$, where $R^1$ and $R^2$ can be independently hydrogen or any hydrocarbyl group; such as $R^1$ is hydrogen and $R^2$ is an alkyl group. A "linear alpha-olefin" is an alpha-olefin wherein $R^1$ is hydrogen and $R^2$ is hydrogen or a linear alkyl group. Unless otherwise specified, the term "$C_n$," means hydrocarbon(s) having n carbon atom(s) per molecule, wherein n is a positive integer. For the purposes of the present disclosure, ethylene shall be considered an α-olefin.

When a polymer or copolymer is referred to herein as comprising an alpha-olefin (or α-olefin), including, but not limited to ethylene, propylene, 1-butene, and 1-hexene, the olefin present in such polymer or copolymer is the polymerized form of the olefin. For example, when a polymer is said to have an "ethylene content", "ethylene-derived content", or "ethylene monomer content" of 80 to 99.9 wt %, or to comprise "ethylene-derived units" at 80 to 99.9 wt %, it is understood that the mer unit in the copolymer is derived from ethylene in the polymerization reaction and said derived units are present at 80 to 99.9 wt %, based upon the weight of ethylene content plus comonomer content.

Recycled Resin Composition

The recycled resin composition is or can be a blend of at least one recycled resin (PCR and/or PIR), at least one virgin high density polyethylene (hereafter "HDPE") and at least one virgin metallocene catalyzed linear low density polyethylene (hererafter "mLLDPE"). The HDPE content can be up to about 45 wt %, based on the total weight of the composition. The HDPE preferably has a $MI_2$ of about 0.1 to about 1.0 g/10 min and a density of about 0.940 g/cm$^3$ to about 0.965 g/cm$^3$. The mLLDPE content can be 5 wt %, 10 wt %, or 15 wt % of the total weight of the recycled resin composition. The mLLDPE content can also range from a low of about 1 wt %, 2 wt %, or 3 wt % to a high of about 10 wt %, 13 wt %, or 15 wt %; with ranges from any foregoing low to any foregoing high contemplated. The amount of the recycled post consumer resin can be up to 99 wt %, based on the total weight of the composition. The amount of the recycled post consumer resin can also range from a low of about 50 wt %, 60 wt %, 70 wt %, or 80 wt % to a high of about 80 wt %, 90 wt %, 95 wt % or 99 wt %; with ranges from any foregoing low to any foregoing high contemplated. The amount of the recycled post consumer resin can also be at least 25 wt %, 50 wt %, or 75 wt %, based on the total weight of the composition. In some embodiments, the recycled resin blend can contain no more than 3 wt % of virgin LDPE and virgin LLDPE. In some embodiments, the recycled resin blend contains no added LDPE and no added LLDPE.

The recycled resin composition can have any one or more, or preferably both, of the following properties:
  a flex modulus @0.05 in/min of 110,000 psi to 180,000 psi, as measured by ASTM D790, Proc. A 1% Secant Modulus; preferably 120,000 psi to about 175,000 psi; more preferably 135,000 psi to about 175,000 psi; and/or
  an ESCR, as measured by 100% Igepal Cond B, ASTM D1693, of about 10 hr to about 75 hr; preferably about 15 hours to about 70 hours; more preferably about 20 hours to about 70 hours.

HDPE

The HDPE content can be up to about 45 wt %, based on the total weight of the composition. For example, the HDPE content can range from a low of about 15, 20 or 25 wt % to a high of about 35, 40 or 45 wt %. In various embodiments, the HDPE is not particularly limited to properties other than density greater than or equal to 0.935 g/cm$^3$, preferably greater than or equal to 0.940 g/cm$^3$, 0.945 g/cm$^3$, 0.950 g/cm$^3$, or even 0.955 g/cm$^3$, such as within the range from a low of any one of 0.935, 0.940, 0.945, 0.950, or 0.955 g/cm$^3$ to a high of any one 0.956, 0.960, 0.962, 0.965, 0.967, or 0.970 g/cm³, with ranges from any foregoing low to any foregoing high contemplated (e.g., 0.955 to 0.970 g/10 min). The HDPE preferably has density of about 0.940 g/cm³ to about 0.965 g/cm³.

The HDPE can also have a melt index ($I_{2.16}$, 190° C., 2.16 kg load) within the range from 0.1 to 1.5 g/10 min, preferably 0.5 to 1.0 g/10 min. The HDPE can also have a Vicat Softening temperature within the range from 120° C. to 150° C., such as within the range from 125° C. to 135° C. or 140° C. The HDPE preferably has a $MI_2$ of about 0.1 to about 1.0 g/10 min and a density of about 0.940 g/cm³ to about 0.965 g/cm³.

Suitable HDPEs include PE homopolymers as well as ethylene-α-olefin copolymers, and they may be produced by any suitable process known to those skilled in the art, e.g., gas-phase fluidized bed polymerization or slurry polymerization, or a combination thereof (e.g., in the case of reactor or other bimodal HDPE compositions, which may be produced in two or more series reactors).

Recycled Resin

As mentioned above, the recycled resin is or can be Post-Consumer Resins (PCR), Post-Industrial Resin (PIR), or any combinations thereof. The recycled resin, for example, is or can be a copolymer PCR having a melt index ($MI_2$) of 0.2 g/10 min to 1.2 g/10 min with a density of 0.953 to 0.965 g/cm³. The melt index ($MI_2$) can also be 0.5 g/10 min to 0.9 g/10 min. The melt index ($MI_2$) can also range from a low of 0.2, 0.3, 0.4 or 0.5 g/10 min to a high of 0.6, 0.7, 0.8, 0.9, or 1.2 g/10 min; with ranges from any foregoing low to any foregoing high contemplated. A particularly preferred melt index ($MI_2$) is within the range from about 0.5 to 0.8 g/10 min, such as about 0.70, 0.71, or 0.72 g/10 min. The density can also range from 0.950, 0.952, 0.955, 0.956, 0.957, or 0.958 g/cm³ to a high of 0.960, 0.961, or 0.962 g/cm³, with ranges from any low end to any high end contemplated. A particularly preferred density is 0.956 to 0.961 g/cm³, such as about 0.958, 0.959, 0.960, or 0.961 g/cm³.

In other embodiments, the recycled resin is or can be a homopolymer PCR having a melt index ($MI_2$) of 0.15 g/10 min to 1.15 g/10 min with a density of 0.954 to 0.966 g/cm³. The melt index ($MI_2$) can also be 0.45 g/10 min to 0.85 g/10 min. The melt index ($MI_2$) can also range from a low of 0.15, 0.30, 0.45, 0.50, 0.55, or 0.60 g/10 min to a high of 0.70, 0.75, 0.80, 0.85, 0.95, or 1.15 g/10 min; with ranges from any foregoing low to any foregoing high contemplated. A particularly preferred melt index ($MI_2$) is within the range from 0.60 to 0.70 g/10 min, such as about 0.65 g/10 min. The density can also range from 0.955, 0.956, or 0.957 g/cm³ to 0.963, 0.964 or 0.965 g/cm³. A particularly preferred density is 0.957 to 0.963 g/cm³, such as about 0.960 g/cm³.

mLLDPE Modifier

The mLLDPE modifier in the recycled resin blend is a linear low density polyethylene (LLDPE) made using one or more metallocene catalysts (mLLDPE). The mLLDPE can include copolymers of 80 to 99.9 wt % ethylene-derived units, with the balance of units derived from one or more $C_3$ to $C_{12}$ α-olefin comonomers (and in particular one or more of butene, hexene, octene; and more preferably hexene). The wt % is based on total mass of ethylene-derived units plus comonomer-derived units in the polyethylene. In one or more embodiments, the mLLDPE modifier can be or can include one or more mLLDPEs having a modest degree of long chain branching (LCB), such as can be produced using bridged metallocene catalysts as described in U.S. Pat. No. 6,255,426, which is incorporated by reference herein. Because of the presence of some long-chain branching in these mLLDPEs (as compared to the highly linear structure of most mLLDPEs), such mLLDPEs may be referred to herein as "LCB-mLLDPE." Also or instead, the mLLDPE modifier can be or can include one or more LLDPEs having narrow MWD with a broad orthogonal comonomer distribution ("BOCD"), which may be referred to herein as Narrow MWD BOCD-mLLDPEs, and include those described in (and/or those produced by methods and/or catalysts described in) one or more of the following, each of which is incorporated herein by reference: U.S. Pat. No. 9,181,362; U.S. RE40751; US2015/225521, US2015/291748; US2015/240000; US2015/259445; and US2015/284523. Finally, a third variety of mLLDPE modifier (useful on its own or in conjunction with one or both of the LCB-mLLDPE and BOCD-mLLDPE) also has a BOCD nature, but broader molecular weight distribution as compared to the BOCD-mLLDPE; and is preferably made using a dual metallocene catalyst system, such as those described in one or more of U.S. Pat. Nos. 10,611,867; 10,808,053; and 11,274,196; WIPO Publication WO2019/108327; or US Publication No. US2021/0238321, each of which are incorporated herein by reference (and which further include description of relevant broad MWD BOCD mLLDPEs). Such mLLDPE may be referred to as a "Broad-BOCD-mLLDPE." Each is described in more detail below.

Long-Chain-Branched mLLDPEs

Figure 4:
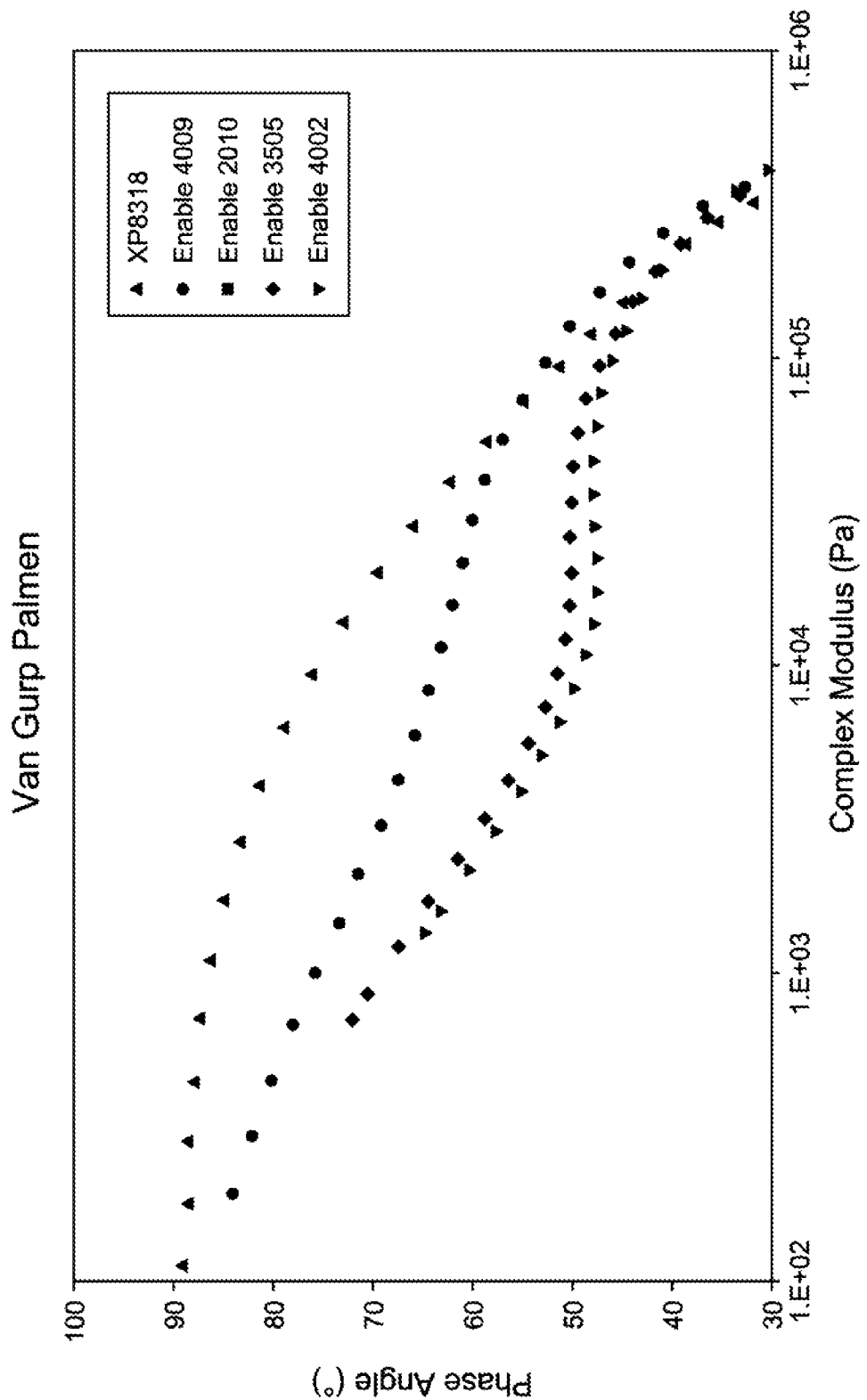
FIG. 4 is a graph illustrating VGP (Van Gurp Palmen) curves for certain commercial examples of suitable first and second mLLDPE modifiers as described herein.

Long chain branched mLLDPEs ("LCB mLLDPE") are considered long-chain-branched as compared to other linear low-density polyethylenes, and in particular as compared to other metallocene LLDPEs; whereas their total long-chain branching will still be less than LDPEs with very high degrees of long-chain branching.) This small amount of LCB can be evidenced through, e.g., a high melt index ratio (MIR) and/or particular rheology characteristics as shown through data obtained by small angle oscillatory shear (SAOS) experiments (for instance, ratio of $\eta_{0.01}/\eta_{100}$, the complex viscosity recorded at shear rates of 0.01 and 100 rad/s, respectively). Another useful parameter for indicating the presence of LCB is illustrated in FIG. 4: Van Gurp Palmen (VGP) plots. In particular, polyethylene copolymers (even LLDPE) with some LCB will exhibit an inflection point in their VGP curve, while LLDPE without any LCB present show no such inflection point. See, for example, the Enable™ brand LLDPEs, examples of LCB-mLLDPEs, in FIG. 4, as compared to the XP8318, which is an example of the narrow-MWD BOCD-mLLDPEs discussed below.

Yet another useful parameter illustrating presence of some LCB can be seen in the melt index ratio. Melt index ratio (MIR) is the ratio of high load melt index (HLMI, ASTM D1238 at 190° C., 21.6 kg) to melt index ($MI_2$, ASTM D1238 at 190° C., 2.16 kg).

Accordingly, LCB-mLLDPEs useful for the present compositions can have one or more of the following properties (which can be useful indicia of moderate LCB):

MIR within the range from a low of any one of 20, 25, 26, 27, 28, 29, 30, or 31 to a high of any one of 40, 35, 34, 33, 32, 31, or 30 with ranges from any of the foregoing lows to any of the foregoing highs contemplated herein (e.g., 27 to 33, such as 28 to 32, or 29 to 31).

Complex shear viscosity ($\eta^*$) @ 0.01 rad/sec and 190° C. in the range of 5,000 to 12,000 Pa·s; or from a low of any one of 5,000; 6,000; 7,000; 8,000; 9,000; 10,000; or 11,000 Pa·s, to a high of any one of 12,000; 11,000; 10,000; 9,000; 8,000; 7,000; or 6,000 Pa·s, with ranges from any low end to any high end contemplated (e.g., 6,000 to 8,000 Pa·s).

Complex shear viscosity (η*) @ 100 rad/sec and 190° C. within the range from 900 to 2000 Pa·s; such as from a low end of any one of 900; 1,000; 1,100; or 1,200 Pa·s to a high end of any one of 1,200; 1,300; 1,400; 1,500; or 2,000 Pa·s, with ranges from any foregoing low to any foregoing high also contemplated (e.g., 1,100 to 1,300 Pa·s).

Shear thinning ratio (η* @ 0.01/100) less than 15, or in the range of 3 to 15, or 4 to 12, or 5 to 10, or 5.5 to 8.

An inflection point in a Van Gurp Palmen plot of phase angle vs. complex modulus (Pa) of the LCB-mLLDPE.

Finally, yet another indicator of LCB can be seen in the LCB index (g' or alternatively g'vis), which for LCB-mLLDPE could be less than 1, such as within the range from 0.9 to 0.99 or 0.94 to 0.98, although still substantially higher than g' for heavily-LCB polyethylene, such as LDPE made using free radical polymerization.

Suitable mLLDPEs with the aforementioned moderate LCB are preferably copolymers of 80, 85, 88, 90, 92, 93, 94, or 95 to 6, 97, 98, or 99 wt % ethylene-derived units, with the balance derived from one or more $C_3$ to $C_{12}$ α-olefins (and in particular one or more of butene, hexene, octene; preferably one of those; and more preferably hexene). The wt % is based on total mass of ethylene-derived units plus comonomer-derived units in the polyethylene.

Suitable LCB mLLDPEs can also have a CDBI greater than or equal to 60%, preferably greater than or equal to 70%, such as within the range from a low of any one of 60, 70, or 75% to a high of 80, 85, 90, 95, or 99%, with ranges from any foregoing low end to any foregoing high end contemplated. Composition Distribution Breadth Index ("CDBI") is defined as the weight percentage of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., J. Poly. Sci., Poly. Phys. Ed., Vol. 20, p. 441 (1982) and U.S. Pat. No. 5,008,204, which are fully incorporated herein by reference.

Suitable LCB mLLDPEs can also have a MWD (Mw/Mn) within the range of 2.5 to 5.5, such as within the range of 3 or 3.5 to 4.5 or 5.

Suitable LCB mLLDPEs can further have a Melt Index ($I_2$, determined per ASTM D1238 at 190° C., 2.16 kg load) within the range of 0.1 to 3.0 g/10 min, or can range from a low of any one of 0.1, 0.15, 0.2, or 0.22 to a high of any one of 0.30, 0.40, 0.50, 0.60, 0.70, 0.80, 0.90, 1.0, 1.5, 2.0, 2.2, 2.5, 2.7, or 3.0 g/10 min; with ranges from any foregoing low end to any foregoing high end also contemplated (provided the high end is greater than the low end), e.g., from 0.1 to 2.5 g/10 min; 0.15 to 1.0 g/10 min; or 0.2 to 0.50 g/10 min.

High load melt index (HLMI, or $I_{21}$, determined per ASTM D1238 at 190° C., 21.6 kg load) can be within the range from 10 to 75 g/10 min, such as from 12 to 70 g/10 min.

Density of the LCB-mLLDPE can be within the range from 0.900 to 0.940 g/cm³, such as from a low of any one of 0.905, 0.910, 0.920, or 0.925 g/cm³ to a high of any one of 0.930, 0.932, 0.933, 0.934, 0.935, or 0.940 g/cm³, with ranges from any forgoing low to any foregoing high contemplated herein (e.g., 0.910 to 0.935 g/cm³).

These LCB-mLLDPEs can be referred to as a "first mLLDPE" in compositions described herein. Some particular examples of such first mLLDPEs having the foregoing unique combination of properties include certain Enable™ and Exceed™ XP brand polyethylenes from ExxonMobil Chemical Company, such as Exceed™ XP 6026, Enable™ 2010, Enable™ 2703, Enable™ 3505, Enable™ 4002, and Enable™ 4009 performance polyethylenes. Other commercial examples include Dow Innate™ ST70, Dow Agility™ 2001, Dow Elite™ 5940, Dowlex™ 2038.68G, Dow Elite™ AT 6401, Dow Attane™ 4701G, Marlex™ TR130, and Nova Surpass™ 117/116.

Narrow MWD BOCD-mLLDPE

As mentioned above, a suitable mLLDPE can have a narrow molecular weight distribution (MWD) with broad orthogonal composition distribution (BOCD). The molecular weight distribution (MWD) or (Mw/Mn) can range from about 2.0 to about 4.5, from about 2.2 to about 4.5, from about 3.0 to about 4.0, or from about 2.5 to about 4.0. The weight average molecular weight (Mw) can range from about 15,000 to about 400,000 g/mol, from about 20,000 to about 250,000 g/mol, from about 20,000 to about 200,000 g/mol, from about 25,000 to about 150,000 g/mol, from about 150,000 to about 400,000 g/mol, from about 200,000 to about 400,000 g/mol, or from about 250,000 to about 350,000 g/mol. The z-average molecular weight (Mz) to weight average molecular weight (Mw) ratio can be greater than about 1.5, or greater than about 1.7, or greater than about 2.0. In some embodiments, this ratio is from about 1.7 to about 3.5, from about 2.0 to about 3.0, or from about 2.2 to about 3.0.

The term "orthogonal comonomer distribution" is used herein to mean across the molecular weight range of the polymer, comonomer contents for the various polymer fractions are not substantially uniform and a higher molecular weight fraction thereof generally has a higher comonomer content than that of a lower molecular weight fraction. The term "substantially uniform comonomer distribution" is used herein to mean that comonomer content of the polymer fractions across the molecular weight range of the ethylene-based polymer vary by <10.0 wt %. In some embodiments, a substantially uniform comonomer distribution may refer to <8.0 wt %, <5.0 wt %, or <2.0 wt %. Both a substantially uniform and an orthogonal comonomer distribution may be determined using fractionation techniques such as gel permeation chromatography-differential viscometry (GPC-DV), temperature rising elution fraction-differential viscometry (TREF-DV) or cross-fractionation techniques.

The broadness of the composition distribution of the polymer may be characterized by $T_{75}-T_{25}$. TREF is measured using an analytical size TREF instrument (Polymer-char, Spain), with a column of the following dimensions: inner diameter (ID) 7.8 mm, outer diameter (OD) 9.53 mm, and column length of 150 mm. The column may be filled with steel beads. 0.5 mL of a 4 mg/ml polymer solution in orthodichlorobenzene (ODCB) containing 2 g BHT/4 L were charge onto the column and cooled from 140° C. to −15° C. at a constant cooling rate of 1.0° C./min Subsequently, ODCB may be pumped through the column at a flow rate of 1.0 ml/min, and the column temperature may be increased at a constant heating rate of 2° C./min to elute the polymer. The polymer concentration in the eluted liquid may then be detected by means of measuring the absorption at a wavenumber of 2941 cm⁻¹ using an infrared detector. The concentration of the ethylene-α-olefin copolymer in the eluted liquid may be calculated from the absorption and plotted as a function of temperature. As used herein, $T_{75}-T_{25}$ values refer to where $T_{25}$ is the temperature in degrees Celsius at which 25% of the eluted polymer is obtained and $T_{75}$ is the temperature in degrees Celsius at which 75% of the eluted polymer is obtained via a TREF analysis.

By "broad orthogonal comonomer distribution" or BOCD, it is meant that a substantially higher degree of short chain branching is present on longer molecular-weight polymer chains than on shorter molecular-weight polymer chains within the copolymer. Suitable narrow-MWD mLLDPEs with BOCD can have a $T_{75}-T_{25}$ value from 5 to 10, alternatively, a $T_{75}-T_{25}$ value from 5.5 to 10, and alternatively, a $T_{75}-T_{25}$ value from 5.5 to 8, alternatively, a $T_{75}-T_{25}$ value from 6 to 10, and alternatively, a $T_{75}-T_{25}$ value from 6 to 8, where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF).

These mLLDPEs can have a CDBI of less than about 40%, or less than about 35%, or less than about 30%, or less than about 25%. The CDBI can also range from a low of about 15, 20, or 25% to a high of about 30, 35, or 40%, and it is further noted that composition distribution is such that higher molecular weight chains of these mLLDPEs have greater wt % of comonomer than lower molecular weight chains of the mLLDPEs.

These mLLDPEs can have 70.0 wt % to 100.0 wt % of units derived from ethylene. The lower limit on the range of ethylene content may be from 70.0 wt %, 75.0 wt %, 80.0 wt %, 85.0 wt %, 90.0 wt %, 92.0 wt %, 94.0 wt %, 95.0 wt %, 96.0 wt %, 97.0 wt %, 98.0 wt %, or 99.0 wt % based on the wt % of polymer units derived from ethylene. These mLLDPEs can also have an upper ethylene limit of 80.0 wt %, 85.0 wt %, 90.0 wt %, 92.0 wt %, 94.0 wt %, 95.0 wt %, 96.0 wt %, 97.0 wt %, 98.0 wt %, 99.0 wt %, 99.5 wt %, or 100.0 wt %, based on polymer units derived from ethylene. Less than 30.0 wt % of polymer units can be derived from a C3-C20 olefin, preferably, an alpha-olefin, e.g., hexene or octene. The lower limit on the range of C3-C20 olefin-content can be 25.0 wt %, 20.0 wt %, 15.0 wt %, 10.0 wt %, 8.0 wt %, 6.0 wt %, 5.0 wt %, 4.0 wt %, 3.0 wt %, 2.0 wt %, 1.0 wt %, or 0.5 wt %, based on polymer units derived from the C3-C20 olefin. The upper limit on the range of C3-C20 olefin-content can be 20.0 wt %, 15.0 wt %, 10.0 wt %, 8.0 wt %, 6.0 wt %, 5.0 wt %, 4.0 wt %, 3.0 wt %, 2.0 wt %, or 1.0 wt %, based on polymer units derived from the C3 to C20 olefin.

These mLLDPEs can have a density in accordance with ASTM D-4703 and ASTM D-1505/ISO 1183 of from about 0.900 to about 0.940 g/cm³, from about 0.910 to about 0.935 g/cm³, from about 0.900 to about 0.930 g/cm³, from about 0.900 to about 0.925 g/cm³, from about 0.900 to about 0.923 g/cm³, from about 0.900 to about 0.920 g/cm3, from about 0.912 to about 0.919 g/cm³, from about 0.912 to about 0.918 g/cm³, from about 0.914 to about 0.918 g/cm³, or from about 0.915 to about 0.918 g/cm³.

These mLLDPEs can have a melt index (MI) or ($I_{2.16}$) as measured by ASTM D-1238-E (190° C./2.16 kg) of about 0.1 g/10 min to about 5.0 g/10 min, about 0.1 g/10 min to about 3.0 g/10 min, about 0.1 g/10 min to about 2.0 g/10 min, about 0.1 g/10 min to about 1.2 g/10 min, about 0.2 g/10 min to about 1.5 g/10 min, about 0.2 g/10 min to about 1.1 g/10 min, about 0.3 g/10 min to about 1.0 g/10 min, about 0.4 g/10 min to about 1.0 g/10 min, about 0.5 g/10 min to about 1.0 g/10 min, about 0.6 g/10 min to about 1.0 g/10 min, about 0.7 g/10 min to about 1.0 g/10 min, or about 0.75 g/10 min to about 0.95 g/10 min.

These mLLDPEs can have a melt index ratio (MIR) (I21.6/I2.16) (as defined below) of from about 20.0 to about 35.0, from about 22 to about 38, from about 20 to about 32, from about 25 to about 32 or from about 28 to about 31.

These mLLDPEs can also have at least a first peak and a second peak in a comonomer distribution analysis, wherein the first peak has a maximum at a log(Mw) value of from 4.0 to 5.4, or from 4.3 to 5.0, or from 4.5 to 4.7; and a TREF elution temperature of from 70.0° C. to 100.0° C., or from 80.0° C. to 95.0° C., or from 85.0° C. to 90.0° C. The second peak in the comonomer distribution analysis has a maximum at a log(Mw) value of 5.0 to 6.0, 5.3 to 5.7, or 5.4 to 5.6; and a TREF elution temperature of 40.0° C. to 60.0° C., 45.0° C. to 60.0° C., or 48.0° C. to 54.0° C.

In any of the embodiments described above, a suitable mLLDPE can have a narrow MWD with broad orthogonal composition distribution with one or more of the following properties: a melt index (MI) (190° C./2.16 kg) of from about 0.1 g/10 min to about 5.0 g/10 min; a melt index ratio (MIR) of from about 25 to about 32; a Mw of from about 20,000 to about 200,000 g/mol; a Mw/Mn of from about 2.0 to about 4.5; and a density of from about 0.900 to about 0.940 g/cm³. These narrow MWD BOCD-mLLDPEs may be referred to as a "second mLLDPE" in recycled resin compositions of the present disclosure.

Commercially available examples of such second mLLDPEs having the foregoing unique combination of properties include Exceed XP™ resins from ExxonMobil Chemical Company.

Broad MWD BOCD-mLLDPE

As mentioned above, other suitable mLLDPEs can have a broad molecular weight distribution (MWD) with a broad orthogonal composition distribution (BOCD). The MWD of these mLLDPEs can range, for example, from about 6.0 to about 10.0, from about 6.4 to about 9.5, from about 6.0 to about 9.0, from about 6.5 to about 10.0, or from 7.0 to 8.5.

These mLLDPEs can have a density in accordance with ASTM D-4703 and ASTM D-1505/ISO 1183 of from about 0.900 to about 0.940 g/cm³, from about 0.910 to about 0.935 g/cm³, from about 0.910 to about 0.930 g/cm³, from about 0.900 to about 0.925 g/cm³, from about 0.900 to about 0.933 g/cm³, from about 0.900 to about 0.920 g/cm3, from about 0.912 to about 0.919 g/cm³, from about 0.912 to about 0.938 g/cm³, from about 0.914 to about 0.928 g/cm³, or from about 0.915 to about 0.938 g/cm³.

These mLLDPEs can have a branching index (as defined herein) of g'(vis)≥0.95, 0.96, ≥0.97, ≥0.98, ≥0.99 or 1.0, for example, from 0.95 to 1.0, from 0.96 to 1.0, from 0.97 to 0.995, from 0.98 to 0.998, from 0.98 to 0.99, from 0.99 to 1.0. Preferably, the g'(vis) is ≥0.98 or ≥0.995.

Suitable Broad MWD BOCD-mLLDPEs can have a BOCD characterized in that the $T_{75}-T_{25}$ value is 15° C. or greater, 17.5° C. or greater, 20° C. or greater, 25° C. or greater, 30° C. or greater, 35° C. or greater, 40° C. or greater, or 45° C. or greater, wherein $T_{25}$ is the temperature (° C.) at which 25% of the eluted polymer is obtained and $T_{75}$ is the temperature (° C.) at which 75% of the eluted polymer is obtained in a TREF experiment. For instance, the $T_{75}-T_{25}$ value for these Broad MWD BOCD-mLLDPEs can be within the range from 30 or 35° C. to 55, 55, 60, or 65° C. (with ranges from any foregoing low end to any foregoing high end contemplated).

These mLLDPEs can have a CDBI of less than about 40%, or less than about 35%, or less than about 34%, or less than about 33%. The CDBI can also range from a low of about 15, 20, or 25% to a high of about 35, 37, or 40%, and the composition distribution (or comonomer distribution) is such that the mLLDPE has a greater amount (wt %) of comonomer incorporated in its longer (higher molecular weight) polymer chains than the amount (wt %) of comonomer incorporated in its shorter (lower molecular weight) polymer chains. As noted already, GPC analytical methods are suitable for determining relative amounts of comonomer incorporation at high and low polymer chains. For an example of some such polymers and discussion of the incorporation of comonomer along their chains, see, e.g., PCT/US2021/072552, filed 22 Nov. 2021, entitled "Medium Density Polyethylene Compositions with Broad Orthogonal Composition Distribution", and hereby incorporated by reference. These broad-MWD BOCD-mLLDPEs can be referred to as "third mLLDPEs" in recycled resin compositions of the present disclosure.

In any of the embodiments described above, a suitable third mLLDPE can have a broad MWD (e.g., Mw/Mn from about 6.0 to about 10) with broad orthogonal CD and a density of from about 0.900 to about 0.940 g/cm$^3$.

Propylene-Based Elastomer

The recycled resin composition described herein can further include one or more propylene-based elastomers. The one or more propylene-based elastomers can be prepared by polymerizing propylene with a C2 or C4-C20 alpha olefin, such as propylene and ethylene in the presence of a chiral metallocene catalyst with an activator and optional scavenger. The comonomer used with propylene may be linear or branched. Exemplary linear alpha-olefins include ethylene or C4 to C8 alpha-olefins, such as ethylene, 1-butene, 1-hexene, and 1-octene, such as ethylene or 1-butene. Exemplary branched alpha-olefins include 4methyl-1-pentene, 3-methyl-1-pentene, and 3,5,5-trimethyl-1-hexene.

Suitable propylene-based elastomers can have an average propylene content on a molar basis of from about 68% to about 92%, such as from about 75% to about 91%, such as from about 78% to about 88%, such as from about 80% to about 88%. The balance of the copolymer is one or more alpha-olefins as specified above and optionally minor amounts of one or more diene monomers. Preferably, the propylene-based elastomer contains ethylene as the comonomer in the range of from about 8 to 32 mol %, such as from about 9 to about 25 mol % ethylene, such as from about 12 to about 22 mol % ethylene, such as from about 13 to 20 mol % ethylene.

Suitable propylene-based elastomers can have any one or more, or preferably all, of the following properties:
- a density of from about 0.83 g/cm$^3$ to about 0.92 g/cm$^3$, such as from about 0.85 g/cm$^3$ to about 0.9 g/cm$^3$, such as from about 0.855 g/cm$^3$ to about 0.875 g/cm$^3$, according to ASTM D1505.
- a melt index of from about 0.5 g/10 min to about 21 g/10 min, such as from about 0.5 g/10 min to about 2 g/10 min, alternatively from about 5 g/10 min to about 10 g/min, according to ASTM D1238 (190° C., 2.16 kg).
- a weight average molecular weight of from about 50,000 g/mol to about 300,000 g/mol, such as from about 100,000 g/mol to about 200,000 g/mol, such as from about 100,000 g/mol to about 150,000 g/mol, as determined using GPC;
- a melting point (measured by DSC) of from about 50° C. to about 120° C., such as from about 60° C. to about 105° C., such as from about 80° C. to about 100° C., alternatively from about 60° C. to about 75° C.;
- a melt enthalpy (measured by DSC) of from about 1 J/g to about 50 J/g, such as from about 5 J/g to about 15 J/g, such as from about 5 J/g to about 8 J/g; and
- a melt flow rate of from about 1 g/min to about 70 g/min, such as from about 1 g/min to about 10 g/min, such as from about 1 g/min to about 5 g/min, alternatively from about 20 g/min to about 5 g/min, per ASTM D1238 (230° C.; 2.16 kg).

The propylene-based elastomer can be any or more specific VISTAMAXX™ elastomers that are commercially available from ExxonMobil Chemical Company. Suitable elastomers include Vistamaxx™ 3020, Vistamaxx™ 6102, Vistamaxx™ 6202 and VISTAMAXX™ 6502. VISTAMAXX™ propylene-based elastomers are copolymers of propylene and ethylene. VISTAMAXX™ are propylene rich (>80%) and are semi-crystalline materials with high amorphous content. Their synthesis is based on ExxonMobil Chemical Company's EXXPOL™ technology.

VISTAMAXX™ 3020 propylene-ethylene performance polymer ("VM3020") is available from ExxonMobil Chemical Company. VM3020 has an ethylene content of 11 wt % with the balance being propylene. Typical properties of VM3020 include: a density of 0.874 g/cm$^3$ (ASTM D1505); a melt index of 1.2 g/10 min (ASTM D1238; 190° C., 2.16 kg); a melt mass flow rate of 3 g/10 min (230° C., 2.16 kg); a Shore D hardness of 29 (ASTM D2240); and a Vicat softening temperature (VST) of 67° C.

VISTAMAXX™ 6102 propylene-ethylene performance polymer ("VM6102") is available from ExxonMobil Chemical Company. VM6102 has an ethylene content of 16 wt % with the balance being propylene. Typical properties of VM6102 include: a density of 0.862 g/cm$^3$ (ASTM D1505); a melt index of 1.4 g/10 min (ASTM D1238; 190° C., 2.16 kg); a melt mass flow rate of 3 g/10 min (230° C., 2.16 kg); a Shore A hardness of 67 (ASTM D2240); and a Vicat softening temperature of 52.2° C. (ASTM D1525).

VISTAMAXX™ 6202 propylene-ethylene performance polymer ("VM6202") is available from ExxonMobil Chemical Company. VM6202 has an ethylene content of 15 wt % with the balance being propylene. Typical properties of VM6202 include: a density of 0.862 g/cm$^3$ (ASTM D1505); a melt index of 9.1 g/10 min (ASTM D1238; 190° C., 2.16 kg); a melt mass flow rate of 20 g/10 min (230° C., 2.16 kg); a Shore A hardness of 64 (ASTM D2240); and a Vicat softening temperature of 45.2° C.

VISTAMAXX™ 6502 propylene-ethylene performance polymer ("VM6502") is available from ExxonMobil Chemical Company, Houston, Tex. VM6502 is an amorphous HMW SSC-PP copolymer containing about 13% by weight of ethylene comonomer, and a melt flow rate of about 45 g/10 min per ASTM D1238 at 230° C./2.16 kg test conditions.

Additional Test Methods

The distributions and the moments of molecular weight (Mw, Mn, Mw/Mn, etc.), and the branching index (g'vis) are determined by using a high temperature Gel Permeation Chromatography (Polymer Char GPC-IR) equipped with a multiple-channel band-filter based Infrared detector IR5, an 18-angle Wyatt Dawn Heleos light scattering detector and a 4-capillary viscometer with Wheatstone bridge configuration. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and viscometer detector are contained in ovens maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 2 hour. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10 million g/mol. The MW at each elution volume is calculated with the following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are the test samples. In this method, $\alpha_{PS}$=0.67 and $K_{PS}$=0.000175 while α and K are for ethylene-hexene copolymers as calculated from empirical equations (Sun, T. et al. Macromolecules 2001, 34, 6812), in which a=0.695 and K=0.000579 (1−0.75 Wt), where Wt is the weight fraction for hexane comonomer. It should be noted that the comonomer composition is determined by the ratio of the IR5 detector intensity corresponding to CH2 and CH3 channel calibrated with a series of PE and ethylene-hexene homo/copolymer standards whose nominal values are predetermined by NMR or FTIR. Here the concentrations are expressed in g/cm³, molecular weight is expressed in g/mol, and intrinsic viscosity (hence K in the Mark-Houwink equation) is expressed in dL/g.

The LS molecular weight (M) at each point in the chromatogram is determined by analyzing the LS output using the Zimm model for static light scattering $$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and Ko is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For purposes of the present disclosure and the claims thereto (dn/dc)=0.1048 for ethylene-hexene copolymers.

A high temperature Polymer Char viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation $[\eta]=\eta_s/c$, where c is concentration and is determined from the IR5 broadband channel output.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_v^\alpha},$$

where $M_v$ is the viscosity-average molecular weight based on molecular weights determined by LS analysis and the K and α are for the reference linear polymer, which are, for purposes of the present disclosure, α and K are the same as described above for linear polyethylene polymers.

Furthermore, the polyethylene copolymers can have a complex shear viscosity (η') @ 0.01 rad/sec and 190° C. in the range of 5,000 to 12,000 Pa·s; or from a low of any one of 5,000; 6,000; 7,000; 8,000; 9,000; 10,000; or 11,000 Pa·s, to a high of any one of 12,000; 11,000; 10,000; 9,000; 8,000; 7,000; or 6,000 Pa·s, with ranges from any low end to any high end contemplated (e.g., 6,000 to 8,000 Pa·s).

Complex shear viscosity (η*) @ 100 rad/sec and 190° C. may be in the range from 900 to 2000 Pa·s; such as from a low end of any one of 900; 1,000; 1,100; or 1,200 Pa·s to a high end of any one of 1,200; 1,300; 1,400; 1,500; or 2,000 Pa·s, with ranges from any foregoing low to any foregoing high also contemplated (e.g., 1,100 to 1,300 Pa·s).

In some embodiments, the polyethylene copolymers have a shear thinning ratio (η* @ 0.01/100) less than 15, or in the range of 3 to 15, or 4 to 12, or 5 to 10, or 5.5 to 8.

Rheological data such as "Complex shear viscosity (η*)," reported in Pascal seconds, can be measured at 0.01 rad/sec and 100 rad/sec. Complex shear viscosity and other rheological measurements can be obtained from small angle oscillatory shear (SAOS) experiments. For instance, complex shear viscosity can be measured with a rotational rheometer such as an Advanced Rheometrics Expansion System (ARES-G2 model) or Discovery Hybrid Rheometer (DHR-3 Model) using parallel plates (diameter=25 mm) in a dynamic mode under nitrogen atmosphere. The rheometer can be thermally stable at 190° C. for at least 20 minutes before inserting compression-molded specimen onto the parallel plates. To determine the specimen's viscoelastic behavior, a frequency sweep in the range from 0.01 to 628 rad/s can be carried out at a temperature of 190° C. under constant strain that does not affect the measured viscoelastic properties. The sweep frequencies are equally spaced on a logarithmic scale, so that 5 frequencies are probed per decade. Depending on the molecular weight and temperature, strains of 3% can be used and linearity of the response is verified. A nitrogen stream is circulated through the oven to minimize chain extension or cross-linking during the experiments. The specimens can be compression molded at 190° C., without stabilizers. A sinusoidal shear strain can be applied. The shear thinning slope (STS) can be measured using plots of the logarithm (base ten) of the dynamic viscosity versus logarithm (base ten) of the frequency. The slope is the difference in the log(dynamic viscosity) at a frequency of 100 s$^{-1}$ and the log(dynamic viscosity) at a frequency of 0.01 s$^{-1}$ divided by 4. The complex shear viscosity ($\eta^*$) versus frequency ($\omega$) curves can be fitted using the Carreau-Yasuda model: $\eta^*-\eta_\square=(\eta_0-\eta_\square)*(1+(\lambda\omega)^a)^{(n-1)/a}$.

The five parameters in this model are: $\eta_0$, the zero-shear viscosity; $\lambda$, the relaxation time; and n, the power-law index; $\eta_\square$, the infinite rate viscosity; and a, the transition index. The zero-shear viscosity is the value at a plateau in the Newtonian region of the flow curve at a low frequency, where the dynamic viscosity is independent of frequency. The relaxation time corresponds to the inverse of the frequency at which shear-thinning starts. The power-law exponent describes the extent of shear-thinning, in that the magnitude of the slope of the flow curve at high frequencies approaches n−1 on a log($\eta^*$)–log($\omega$) plot. For Newtonian fluids, n=1 and the dynamic complex viscosity is independent of frequency.

In addition to dynamic and complex viscosity (each in Pascal seconds), at each frequency sweep in the SAOS experiment, various other parameters are collected, including storage modulus (Pa), Loss modulus (Pa), Complex Modulus (Pa), tan(delta), and phase angle. Charting the phase angle versus the complex shear modulus from the rheological experiment yields van Gurp Palmen plots useful to extract some information on the molecular characteristics e.g., linear vs. long chain branched chains, type of long chain branching, polydispersity (Dealy, M. J., Larson, R. G., "Structure and Rheology of Molten Polymers", Carl Hanser Verlag, Munich 182-183 (2006). It has been also suggested that VGP-plots can be used to reveal the presence of long chain branching in polyethylene. See Trinkle, S., Walter, P., Friedrich, C. "Van Gurp-Palmen plot II—Classification of long chain branched polymers by their topology", in 41 Rheol. Acta 103-113 (2002).

"Shear Thinning Ratio", which is reported as a unitless number, is characterized by the decrease of the complex viscosity with increasing shear rate. Herein, shear thinning can be determined as a ratio of complex viscosity at a frequency of 0.01 rad/s to the complex viscosity at a frequency of 100 rad/s.

Applications

The formulations described herein are particularly advantageous for use in blow molding applications. Particularly contemplated herein are blends of HDPE and recycle resin, with one or more mLLDPE modifiers (such as the LCB-mLLDPE, narrow-MWD BOCD-mLLDPE, and/or broad-MWD BOCD-mLLDPE described above).

EXAMPLES

Embodiments discussed and described herein can be further described with the following examples. Numerous resin blends were prepared to illustrate the effects of stress crack resistance and impact properties on recycled resins. Significant improvements were obtained when the recycled resins were blended with HDPE and one or more of the mLLDPEs provided herein. Comparisons to similar blends using LDPE and LLDPE resins with similar Melt Indexes and densities are also provided to illustrate the surprising and unexpected results obtained when using the polyethylenes described above. Although the following examples are directed to specific embodiments, they are not to be viewed as limiting in any specific respect.

The tables below show the benefits of adding a mLLDPE, as described herein, to significantly improve the mechanical properties of a blend of Post-Consumer Recycle polymer and HDPE, which is commonly used for extrusion blow molded containers. All percentages are weight percent (wt %) unless otherwise noted.

Table 1 shows the individual polymer components and properties used to prepare the PCR blends reported in Tables 2-16. The individual polymer components are described in more detail below. Tables 2, 3, 4, and 5 are blends of various HDPEs with 25 wt % PCR Copolymer, with and without mLLDPE modifiers. Tables 6, 7, 8 are blends of various HDPEs with 25 wt % PCR Homopolymers, with and without mLLDPE modifiers. Table 9 is a study of PCR Homopolymer blended with only mLLDPE modifiers, no HDPE, and Table 10 is a study of PCR Copolymer blended with only mLLDPE modifiers, no HDPE. Tables 11, 12, 13, 14 are blends of various HDPEs with 50 wt % PCR Copolymer, with and without mLLDPE modifiers. Table 15 are blends of HD9830 HDPE, mLLDPE and 25 wt % PCR Copolymer. Table 16 are blends of 5 wt % BOCD-mLLDPE920 with 70 wt % HDPE and 25 wt % PCR Copolymer.

Individual Polymer Components

PCR KWR102MC or "PCR Copolymer" is a pelletized blend of mixed density recycled polyethylene with up to 7% polypropylene contamination and had a melt flow (ASTM-D1238) of 0.5 g/10 minutes; specific gravity pigmented (ASTM-D1505) of 0.956 g/ml; Tensile Yield Strength (ASTM-D638) of 3,100 psi; Flexural Modulus (ASTM-D790) of 125,000 psi; and a non break Moisture/Weight Loss at 105° C. (KW-MA01) of 0.07%. PCR KWR101-150 or "PCR Homopolymer" is a natural homopolymer high density polyethylene resin with Melt Flow (ASTM-D1238) of 0.6 g/10 minutes; specific gravity (ASTM-D792) of 0.960 g/ml; Flexural Modulus (ASTM-D790) of 165,000 psi; Tensile Yield Strength (ASTM-D638) of 3,700 psi and moisture (KW-MA01) of 0.02%.

AL 55-003 is unimodal copolymer fractional melt high density polyethylene.

HD9830.02 is a bimodal copolymer fractional melt high density polyethylene.

HYA 600 is unimodal copolymer fractional melt high density polyethylene.

SP5504 is PAXON™ SP5504 HDPE resin, a unimodal copolymer fractional melt high density polyethylene available from ExxonMobil.

Marlex 5502BN is a unimodal copolymer fractional melt high density polyethylene.

Enable™ 2010CB is a metallocene catalyzed ethylene 1-hexene copolymer that was obtained from ExxonMobil Chemical Company. It has a melt index (190° C./2.16 kg) of 1.0 g/10 min, Peak melting temperature (determined by DSC) of 114° C., a Vicat softening temperature of 106° C. and a density of 0.920 g/cm$^3$.

Enable™ 2703 MC is a metallocene catalyzed ethylene 1-hexene copolymer that was obtained from ExxonMobil Chemical Company. It has a melt index (190° C./2.16 kg) of 0.30 g/10 min, a Peak melting temperature (determined by DSC) of 119° C., a Vicat softening temperature of 115° C. and a density of 0.927 g/cm$^3$.

Enable™ 4002 MC is a metallocene catalyzed ethylene 1-hexene copolymer that was obtained from ExxonMobil Chemical Company. It has a melt index (190° C./2.16 kg) of 0.25 g/10 min, a Peak melting temperature (determined by DSC) of 128° C., a Vicat softening temperature of 122° C. and a density of 0.938 g/cm³.

Exceed™ XP6026 is a metallocene catalyzed linear low density polyethylene 1-hexene copolymer that was obtained from ExxonMobil Chemical Company. It has a melt index (190° C./2.16 kg) of 0.20 g/10 min, a Peak melting temperature (determined by DSC) of 110° C., a Vicat softening temperature of 90° C. and a density of 0.916 g/cm³.

Exceed™ XP8358 is a metallocene catalyzed ethylene 1-hexene copolymer that was obtained from ExxonMobil Chemical Company. It has a melt index (190° C./2.16 kg) of 0.50 g/10 min, a Peak melting temperature (determined by DSC) of 121° C., a Vicat softening temperature of 108° C. and a density of 0.918 g/cm³.

VISTAMAXX™ 3020 is a propylene-ethylene performance polymer ("VM3020") that was obtained from ExxonMobil Chemical Company. VM3020 has an ethylene content of 11 wt % with the balance being propylene. Typical properties of VM3020 include: a density of 0.874 g/cm³ (ASTM D1505); a melt index of 1.2 g/10 min (ASTM D1238; 190° C., 2.16 kg); a melt mass flow rate of 3 g/10 min (230° C., 2.16 kg); a Shore D hardness of 29 (ASTM D2240); and a Vicat softening temperature (VST) of 67° C.

BOCD-mLLDPE920 is an ethylene-1-hexene copolymer made using a dual metallocene catalyst system following WO2019/083609, and having melt index of 0.79 g/10 min (ASTM D1238, 190° C., 2.16 kg loading), HLMI of 23.21 g/10 min (ASTM D1238, 190° C., 21.6 kg loading), and MIR (HLMI/MI) of 29.4; with density (ASTM D1505) of 0.920 g/cm³. It is an example of a broad-MWD BOCD-mLLDPE as described herein.

VISTAMAXX™ 6102 is a propylene-ethylene performance polymer ("VM6102") that was obtained from ExxonMobil Chemical Company. VM6102 has an ethylene content of 16 wt % with the balance being propylene. Typical properties of VM6102 include: a density of 0.862 g/cm³ (ASTM D1505); a melt index of 1.4 g/10 min (ASTM D1238; 190° C., 2.16 kg); a melt mass flow rate of 3 g/10 min (230° C., 2.16 kg); a Shore A hardness of 67 (ASTM D2240); and a Vicat softening temperature of 52.2° C. (ASTM D1525).

LLDPE LL 3201 is an ethylene 1-hexene copolymer that was obtained from ExxonMobil Chemical Company.

LD 071.LR is a low density polyethylene resin that was obtained from ExxonMobil Chemical Company.

Exact 5171 is a metallocene catalyzed ethylene 1-octene copolymer that was obtained from ExxonMobil Chemical Company.

In the tables below, Melt Index ($MI_2$) was determined per ASTM D1238 at 190° C., 2.16 kg load). High load melt index (HLMI, or $MI_{21}$) was determined per ASTM D1238 at 190° C., 21.6 kg load); Melt index ratio (MIR) is the ratio of high load melt index (HLMI) measured per ASTM D1238 at 190° C., 21.6 kg) to melt index ($MI_2$) measured by ASTM D1238 at 190° C., 2.16 kg). Density was measured in accordance with ASTM D-1505/ISO 1183 and reported in g/cm³. Environmental stress crack resistance (ESCR) was measured by 100% Igepal Cond B, ASTM D1693, and reported in hours (hr). Notched Constant Ligament-Stress (NCLS) tests, reported in hours (hr), are measured per ASTM F2136; 10% Igepal, 50° C., 600 psi, with the sheet prepared by compressional molding per ASTM D4703. Flex Modulus (1% Secant Modulus) or simply "Flex" was measured at 0.05 in/min according to ASTM D790, Proc A, reported in psi.

TABLE 1

Individual polymer components and properties.

| Polymer Description | MI-2 (ASTM-1238) (g/10 min) | MI-21 (ASTM-1238) (g/10 min) | MIR | Density (ASTM-1505) (g/cm³) | ESCR 10% Igepal, Cond B (ASTM D1693) (hours) | ESCR_100% Igepal, Cond B (ASTM D1693) (hours) | NCLS (10% Igepal, 50 C., 600 psi) (hours) | Flex @ 0.05 in/min (ASTM D790, Proc A) 1% Secant Modulus (psi) |
|---|---|---|---|---|---|---|---|---|
| KW Plastics PCR Copolymer KWR102MC | 0.71 | 63.56 | 89.5 | 0.959 | 5.2 | 12.0 | 3.4 | 151000 |
| KW Plastics PCR Homopoly-mer KWR101 | 0.65 | 53.92 | 83.0 | 0.960 | 10.4 | 13.7 | 2.6 | 177000 |
| AL 55-003 | 0.35 | 34.5 | 98.6 | 0.955 | 23.5 | 23.5 | 5.2 | |
| HD9830.02 | 0.40 | 35.33 | 88.3 | 0.956 | 161.5 | 465.2 | 18.3 | 163000 |
| HYA 600 | 0.40 | 28.69 | 71.7 | 0.955 | 37.6 | 46.4 | 6.0 | 152000 |
| SP5504 | 0.39 | 34.3 | 87.9 | 0.955 | 45.9 | 170.0 | 14.1 | 154750 |
| Marlex 5502BN** | 0.39 | 33.36 | 85.5 | 0.955 | 32.7 | 49.8 | 6.7 | |
| Enable 2010CB | 1.00 | 34.04 | 34.0 | 0.921 | 1008 | 1008 | 1003 | 41400 |
| Enable 2703MC | 0.29 | 15.85 | 54.7 | 0.928 | 1008 | 1008 | 1003 | 63200 |
| Enable 4002MC | 0.25 | 16.01 | 64.0 | 0.939 | 1008 | 1008 | 1192 | 94000 |
| Exceed XP6026 | 0.20 | | 0.0 | 0.916 | | | | |
| Exceed XP8358 | 0.50 | | 0.0 | 0.918 | | | | |
| BOCD-mLLDPE-920 | 0.79 | 23.21 | 29.4 | 0.920 | | | | |

TABLE 1-continued

Individual polymer components and properties.

| Polymer Description | MI-2 (ASTM-1238) (g/10 min) | MI-21 (ASTM-1238) (g/10 min) | MIR | Density (ASTM-1505) (g/cm³) | ESCR 10% Igepal, Cond B (ASTM D1693) (hours) | ESCR_100% Igepal, Cond B (ASTM D1693) (hours) | NCLS (10% Igepal, 50 C., 600 psi) (hours) | Flex @ 0.05 in/min (ASTM D790, Proc A) 1% Secant Modulus (psi) |
|---|---|---|---|---|---|---|---|---|
| Vistamaxx 3020 | 1.00 | | 0.0 | | | | | |
| Vistamaxx 6102FL | 1.00 | | 0.0 | | | | | |
| LLDPE LL 3201 | 1.00 | | 0.0 | | | | | |
| LD 071.LR | 1.00 | | 0.0 | | | | | |
| Exact 5171 | 1.13 | 42.73 | 37.8 | | | | | |

TABLE 2

Blends with SP5504 HDPE and 25 wt % PCR Copolymer

| Ex. | Recycled Resin Compositions (wt %) | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 1 | 75% SP5504 25% KWR102MC PCR | 0.46 | 40.3 | 87.5 | 0.957 | 63.9 | 8.7 | 144000 |
| 2 | 70% SP5504 25% KWR102MC PCR 5% Enable 2703MC | 0.46 | 39.5 | 85.9 | 0.955 | 130.6 | 11.6 | 136000 |
| 3 | 70% SP5504 25% KWR102MC PCR 5% Enable 2010CB | 0.47 | 39.4 | 83.9 | 0.955 | 104.9 | 11.0 | 137000 |
| 4 | 70% SP5504 25% KWR102MC PCR 5% Enable 4002MC | 0.44 | 39.4 | 89.6 | 0.956 | 72.8 | 10.7 | 140000 |
| 5 | 70% SP5504 25% KWR102MC PCR 5% Exceed XP 6026ML | 0.45 | 37.9 | 84.3 | 0.955 | 171.3 | 12.2 | 127000 |
| 6 | 70% SP5504 25% KWR102MC PCR 5% Exceed XP8358 | 0.48 | 38.1 | 79.3 | 0.955 | 167.2 | 11.7 | 127000 |
| 7 | 70% SP5504 25% PCR KWR102MC 5% LLDPE LL 3201 | 0.50 | 41.3 | 82.5 | 0.9554 | 116.9 | 9.5 | 126000 |
| 8 | 70% SP5504 25% PCR KWR102MC 5% LD 071.LR | 0.42 | 39.7 | 94.5 | 0.9555 | 40.7 | 6.4 | 135000 |
| 9 | 70% SP5504 25% PCR KWR102MC 5% Exact 5171 | 0.48 | 41.7 | 86.9 | 0.9543 | 72.8 | 7.7 | 126000 |
| 10 | 70% SP5504 25% KWR102MC PCR 5% Vistamaxx 3020 | 0.46 | 41.7 | 90.6 | 0.953 | 72.8 | 9.2 | 130000 |
| 11 | 70% SP5504 25% KWR102MC PCR 5% Vistamaxx 6102FL | 0.48 | 42.1 | 87.6 | 0.951 | 134.4 | 7.6 | 124000 |

TABLE 3

| | Blends with Marlex 5502BN HDPE and 25 wt % PCR Copolymer | | | | | | |
|---|---|---|---|---|---|---|---|
| Ex. | Recycled Resin Compositions (wt %) | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
| 12 | 75% Marlex 5502BN 25% KWR102MC PCR | 0.51 | 40.2 | 78.9 | 0.957 | 14.5 | 5.4 | 143000 |
| 13 | 70% Marlex 5502BN 25% KWR102MC PCR 5% Enable 2703MC | 0.43 | 39.8 | 92.5 | 0.956 | 43.9 | 6.7 | 120000 |
| 14 | 70% Marlex 5502BN 25% KWR102MC PCR 5% Enable 2010CB | 0.45 | 39.4 | 87.6 | 0.955 | 47.3 | 6.0 | 121000 |
| 15 | 70% Marlex 5502BN 25% KWR102MC PCR 5% Enable 4002MC | 0.47 | 38.6 | 82.2 | 0.956 | 43.9 | 6.9 | 144000 |
| 16 | 70% Marlex 5502BN 25% KWR102MC PCR 5% Exceed XP 6026ML | 0.43 | 37.1 | 86.2 | 0.955 | 51.5 | 6.6 | 137000 |
| 17 | 70%Marlex 5502BN 25% KWR102MC PCR 5% Exceed XP8358 | 0.43 | 37.4 | 87.1 | 0.955 | 56.2 | 6.6 | 129000 |
| 18 | 70% Marlex 5502BN 25% PCR KWR102MC 5% LLDPE LL 3201 | 0.49 | 39.2 | 79.9 | 0.9559 | 27 | 5.4 | 138000 |
| 19 | 70% Marlex 5502BN 25% PCR KWR102MCr 5% LD 071.LR | 0.45 | 39.3 | 87.4 | 0.9561 | 16.4 | 4.2 | 141000 |
| 24 | 70% Marlex 5502BN 25% PCR KWR102MCr 5% Exact 5171 | 0.48 | 40.9 | 85.2 | 0.955 | 17 | 4.4 | 135000 |
| 25 | 70% Marlex 5502BN 25% KWR102MC PCR 5% Vistamaxx 3020 | 0.45 | 40.9 | 91.0 | 0.954 | 47.3 | 4.9 | 133000 |
| 26 | 70% Marlex 5502BN 25% KWR102MC PCR 5% Vistamaxx 6102FL | 0.49 | 40.4 | 82.4 | 0.952 | 22.3 | 4.5 | 118,000 |

TABLE 4

Blends with HYA600 HDPE and 25 wt % PCR Copolymer

| Ex. | Recycled Resin Compositions (wt %) | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 27 | 75% HYA600 25% PCR KWR102MC | 0.45 | 37.5 | 83.2 | 0.957 | 24.3 | 5.5 | 144000 |
| 28 | 70% HYA600 25% PCR KWR102MC 5% Enable 2703MC | 0.44 | 34.7 | 78.9 | 0.955 | 45.7 | 7.2 | 146000 |
| 29 | 70% HYA600 25% PCR KWR102MC 5% Enable 2010CB | 0.45 | 36.7 | 81.6 | 0.954 | 45.7 | 7.8 | 137000 |
| 30 | 70% HYA600 25% PCR KWR102MC 5% Enable 4002MC | 0.43 | 35.3 | 82.1 | 0.956 | 38.4 | 7.3 | 145000 |
| 31 | 70% HYA600 25% PCR KWR102MC 5% Exceed XP 6026 ML | 0.42 | 33.8 | 80.5 | 0.954 | 61.2 | 7.5 | 141000 |
| 32 | 70% HYA600 25% PCR KWR102MC 5% LLDPE LL 3201 | 0.5 | 38.1 | 76.2 | 0.9547 | 35.4 | 6.6 | 134000 |
| 33 | 70% HYA600 25% PCR KWR102MC 5% LD 071.LR | 0.44 | 35.9 | 81.5 | 0.9548 | 23.3 | 4.7 | 129000 |
| 34 | 70% HYA600 25% PCR KWR102MC 5% Exact 5171 | 0.48 | 37.0 | 77.1 | 0.954 | 36.3 | 5.0 | 124000 |
| 35 | 70% HYA600 25% PCR KWR102MC 5% Vistamaxx 3020 | 0.46 | 37.6 | 81.8 | 0.952 | 35.9 | 5.5 | 140000 |
| 36 | 70% HYA600 25% PCR KWR102MC 5% Vistamaxx 6102FL | 0.48 | 38.3 | 79.7 | 0.952 | 43.4 | 4.9 | 132000 |

TABLE 5

Blends with AL55-003 HDPE and 25 wt % PCR Copolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 37 | 75% AL55-003 25% PCR KWR102MC | 0.36 | 39.1 | 108.7 | 0.957 | 19.3 | 4.3 | 158000 |
| 38 | 70% AL55-003 25% PCR KWR102MC 5% Enable 2703MC | 0.36 | 37.7 | 104.8 | 0.955 | 21.5 | 5.3 | 137000 |
| 39 | 70% AL55-003 25% PCR KWR102MC 5% Enable 2010CB | 0.40 | 38.3 | 95.7 | 0.955 | 24.0 | 4.6 | 146000 |
| 40 | 70% AL55-003 25% PCR KWR102MC 5% Enable 4002MC | 0.34 | 36.7 | 108.0 | 0.955 | 18.2 | 4.5 | 151000 |

TABLE 5-continued

Blends with AL55-003 HDPE and 25 wt % PCR Copolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 41 | 70% AL55-003 25% PCR KWR102MC 5% Exceed XP 6026 ML | 0.32 | 33.8 | 105.7 | 0.954 | 31.3 | 6.7 | 138000 |
| 42 | 70% AL55-003 25% PCR KWR102MC 5% LLDPE LL 3201 | 0.44 | 40.5 | 92.0 | 0.9551 | 23.3 | 4.4 | 131000 |
| 43 | 70% AL55-003 25% PCR KWR102MC 5% LD 071.LR | 0.4 | 39.5 | 98.8 | 0.9551 | 17.5 | 2.9 | 130000 |
| 44 | 70% AL55-003 25% PCR KWR102MC 5% Exact 5171 | 0.45 | 43.4 | 96.3 | 0.9535 | 23.3 | 2.7 | 123000 |
| 45 | 70% AL55-003 25% PCR KWR102MC 5% Vistamaxx 3020 | 0.38 | 39.1 | 103.0 | 0.952 | 18.7 | 3.8 | 140000 |
| 46 | 70% AL55-003 25% PCR KWR102MC 5% Vistamaxx 6120FL | 0.37 | 39.5 | 106.7 | 0.953 | 14.1 | 3.3 | 130000 |

TABLE 6

Blends with HYA600 HDPE and 25 wt % PCR homopolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 47 | 75% HYA600 25% PCR homopolymer | 0.43 | 34.8 | 81.0 | 0.956 | 24.2 | 4.9 | 155000 |
| 48 | 70% HYA600 25% PCR Homopolymer 5% Enable 2703MC | 0.42 | 34.4 | 81.8 | 0.955 | 32.5 | 5.6 | 143000 |
| 49 | 70% HYA600 25% PCR Homopolymer 5% Enable 2010CB | 0.45 | 35.0 | 77.8 | 0.955 | 19.3 | 5.6 | 141000 |
| 50 | 70% HYA600 25% PCR Homopolymer 5% Enable 4002MC | 0.43 | 34.7 | 80.6 | 0.955 | 22.2 | 5.7 | 154000 |
| 51 | 70% HYA600 25% PCR Homopolymer 5% Exceed XP 6026 ML | 0.41 | 33.0 | 80.5 | 0.954 | 38.4 | 7.1 | 146000 |
| 52 | 70% HYA600 25% PCR Homopolymer 5% LD 071.LR | 0.45 | 35.5 | 78.9 | 0.9549 | 23.3 | 4.6 | 133000 |
| 53 | 70% HYA600 25% PCR Homopolymer 5% LLDPE LL 3201 | 0.5 | 36.5 | 72.9 | 0.9548 | 26.2 | 6.2 | 135000 |

TABLE 6-continued

Blends with HYA600 HDPE and 25 wt % PCR homopolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 54 | 70% HYA600 25% PCR Homopolymer 5% Exact 5171 | 0.5 | 37.3 | 74.7 | 0.9538 | 23.3 | 4.5 | 117000 |
| 55 | 70% HYA600 25% PCR Homopolymer 5% Vistamaxx 3020 | 0.47 | 37.3 | 79.4 | 0.952 | 37.9 | 4.1 | 133000 |
| 56 | 70% HYA600 25% PCR Homopolymer 5% Vistamaxx 6102FL | 0.46 | 37.5 | 81.5 | 0.952 | 39.1 | 3.9 | 132000 |

TABLE 7

Blends with AL55-003 HDPE and 25 wt % PCR Homopolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 57 | 75% AL55-003 25% PCR Homopolymer | 0.35 | 37.4 | 106.8 | 0.957 | 20.9 | 3.8 | 152000 |
| 58 | 70% AL55-003 25% PCR Homopolymer 5% Enable 2703MC | 0.34 | 34.6 | 101.8 | 0.954 | 16.3 | 4.7 | 146000 |
| 59 | 70% AL55-003 25% PCR Homopolymer 5% Enable 2010CB | 0.40 | 37.3 | 93.2 | 0.954 | 20.1 | 4.2 | 145000 |
| 60 | 70% AL55-003 25% PCR Homopolymer 5% Enable 4002MC | 0.39 | 34.9 | 89.6 | 0.955 | 24.0 | 5.4 | 146000 |
| 61 | 70% AL55-003 25% PCR Homopolymer 5% Exceed XP 6026 ML | 0.34 | 33.6 | 98.9 | 0.954 | 28.3 | 5.1 | 150000 |
| 62 | 70% AL55-003 25% PCR Homopolymer 5% LLDPE LL 3201 | 0.47 | 40.1 | 85.2 | 0.9549 | 19.5 | 3.6 | 139000 |
| 63 | 70% AL55-003 25% PCR Homopolymer 5% Exact 5171 | 0.46 | 41.6 | 90.3 | 0.9537 | 7.7 | 2.9 | 125000 |
| 64 | 70% AL55-003 25% PCR Homopolymer 5% Vistamaxx 3020 | 0.39 | 38.2 | 98.0 | 0.948 | 14.3 | 3.5 | 133000 |
| 65 | 70% AL55-003 25% PCR Homopolymer 5% Vistamaxx 6102FL | 0.38 | 38.6 | 101.7 | 0.951 | 18.9 | 3.0 | 146000 |

TABLE 8

Blends with SP5504 HDPE and 25 wt % PCR Homopolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 67 | 70% SP5504 25% PCR Homopolymer 5% Exceed XP8358 | 0.46 | 39.4 | 85.7 | 0.9551 | 58.6 | 8.3 | 142000 |
| 68 | 70% SP5504 25% PCR Homopolymer 5% LLDPE LL 3201 | 0.47 | 39.2 | 83.3 | 0.955 | 32.6 | 7.3 | 142000 |
| 69 | 70% SP5504 25% PCR Homopolymer 5% LD 071.LR | 0.45 | 36.9 | 82.0 | 0.9548 | 31.3 | 5.9 | 124000 |
| 70 | 70% SP5504 25% PCR Homopolymer 5% Exact 5171 | 0.49 | 39.6 | 80.9 | 0.9526 | 39.0 | 6.5 | 121000 |
| 72 | 70% Marlex 5502BN 25% PCR Homopolymer 5% Exceed XP8358 | 0.42 | 36.2 | 86.1 | 0.9548 | 47.3 | 5.4 | 144000 |
| 73 | 70% Marlex 5502BN 25% PCR Homopolymer 5% LD 071.LR | 0.4 | 36.3 | 90.7 | 0.9549 | 18.8 | 3.9 | 141000 |
| 74 | 70% Marlex 5502BN 25% PCR Homopolymer 5% LLDPE LL 3201 | 0.47 | 38.2 | 81.3 | 0.955 | 23.3 | 5.2 | 145000 |
| 75 | 70% 5502BN 25% PCR Homopolymer 5% Exact 5171 | 0.48 | 38.9 | 81.0 | 0.954 | 23.3 | 3.9 | 121,000 |

TABLE 9

Blends with 95 wt % Homopolymer PCR

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 76 | 75% HD9830 25% Homopolymer PCR | 0.42 | 39.5 | 93.9 | 0.958 | 61.2 | 11.2 | 169000 |
| 77 | 95% Homopolymer PCR 5% Enable 2703MC | 0.60 | 50.4 | 83.9 | 0.9596 | 20.9 | 4.9 | 176000 |
| 78 | 95% Homopolymer PCR 5% Enable 2010CB | 0.64 | 50.8 | 79.3 | 0.9595 | 13.4 | 3.5 | 174000 |
| 79 | 95% Homopolymer PCR 5% Enable 4002MC | 0.58 | 51.1 | 88.1 | 0.9600 | 14.6 | 4.5 | 175000 |

TABLE 9-continued

Blends with 95 wt % Homopolymer PCR

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 80 | 95% Homopolymer PCR 5% Exceed XP 6026 | 0.59 | 49.0 | 83.1 | 0.9581 | 12.1 | 2.8 | 169000 |
| 81 | 95% Homopolymer PCR 5% Exceed XP8358 | 0.59 | 49.9 | 84.5 | 0.9582 | 15.5 | 2.7 | 158000 |
| 82 | 95% Homopolymer PCR 5% LLDPE LL 3201 | 0.64 | 52.1 | 81.4 | 0.959 | 6.4 | 2.8 | 144,000 |
| 83 | 95% Homopolymer PCR 5% LD 071.LR | 0.56 | 50.3 | 89.8 | 0.9582 | 5.6 | 2.5 | 154000 |
| 84 | 95% Homopolymer PCR 5% Exact 5171 | 0.64 | 54.1 | 84.5 | 0.958 | 5.6 | 2.1 | 129,000 |
| 85 | 95% Homopolymer PCR 5% Vistamaxx 3020 | 0.66 | 54.3 | 82.3 | 0.9564 | 7.8 | 2.6 | 160000 |
| 86 | 95% Homopolymer PCR 5% Vistamaxx 6102FL | 0.62 | 54.4 | 87.7 | 0.9557 | 9.7 | 3.4 | 157000 |

TABLE 10

Blends with 95 wt % Copolymer PCR

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 87 | Copolymer PCR | 0.71 | 63.6 | 89.5 | 0.9594 | 12.0 | 3.4 | 151000 |
| 88 | 95% Copolymer PCR 5% Enable 2703MC | 0.68 | 57.0 | 83.8 | 0.9590 | 23.6 | 4.8 | 147000 |
| 89 | 95% Copolymer PCR 5% Enable 2010CB | 0.69 | 57.4 | 83.1 | 0.9586 | 20.5 | 4.2 | 146000 |
| 90 | 95% Copolymer PCR 5% Enable 4002MC | 0.65 | 58.0 | 89.2 | 0.9597 | 12.7 | 5.5 | 152000 |
| 91 | 95% Copolymer PCR 5% Exceed XP 6026 | 0.63 | 55.5 | 88.2 | 0.9582 | 20.0 | 3.0 | 146000 |
| 92 | 95% Copolymer PCR 5% Exceed XP8358 | 0.61 | 57.7 | 94.6 | 0.959 | 43.9 | 3.3 | 143000 |
| 93 | 95% Copolymer PCR 5% LLDPE LL 3201 | 0.65 | 60.1 | 92.5 | 0.9596 | 9.0 | 3.3 | 130,000 |
| 94 | 95% Copolymer PCR 5% LD 071.LR | 0.57 | 60.5 | 106.2 | 0.96 | 0.8 | 2.2 | 132000 |
| 95 | 95% Copolymer PCR 5% Exact 5171 | 0.64 | 62.5 | 97.6 | 0.9574 | 13.1 | 2.1 | 120000 |

TABLE 10-continued

Blends with 95 wt % Copolymer PCR

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 96 | 95% Copolymer PCR 5% Vistamaxx 3020 | 0.68 | 60.4 | 88.8 | 0.9573 | 14.9 | 4.0 | 136000 |
| 97 | 95% Copolymer PCR 5% Vistamaxx 6102FL | 0.66 | 60.4 | 91.6 | 0.9554 | 28.9 | 5.8 | 135000 |

TABLE 11

Blends with HYA600 HDPE and 50 wt % PCR Copolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 98 | 50% HYA600 50% PCR KWR102MC | 0.49 | 43.8 | 89.3 | 0.959 | 14.7 | 7.8 | 162000 |
| 99 | 45% HYA600 50% PCR KWR102MC 5% Enable 2703MC | 0.51 | 44.5 | 87.3 | 0.959 | 48.5 | 7.8 | 138000 |
| 100 | 45% HYA600 50% PCR KWR102MC 5% Enable 2010CB | 0.52 | 43.7 | 84.0 | 0.959 | 48.5 | 8.1 | 135000 |
| 101 | 45% HYA600 50% PCR KWR102MC 5% Enable 4002MC | 0.49 | 43.4 | 88.5 | 0.959 | 23.8 | 8.4 | 159000 |
| 102 | 45% HYA600 50% PCR KWR102MC 5% Exceed XP 6026 ML | 0.46 | 40.8 | 88.8 | 0.959 | 16.2 | 7.1 | 139000 |
| 103 | 45% HYA600 50% PCR KWR102MC 5% Exceed XP8358 | 0.48 | 41.5 | 86.4 | 0.958 | 41.7 | 7.9 | 139000 |
| 104 | 45% HYA600 50% PCR KWR102MC 5% LLDPE LL 3201 | 0.55 | 47.5 | 86.4 | 0.958 | 18.7 | 9.0 | 136000 |
| 105 | 45% HYA600 50% PCR KWR102MC 5% LD 071.LR | 0.46 | 41.5 | 90.2 | 0.957 | 18.2 | 5.6 | 158000 |
| 106 | 45% HYA600 50% PCR KWR102MC 5% Exact 5171 | 0.52 | 46.3 | 89.0 | 0.956 | 36.8 | 6.6 | 131000 |
| 107 | 45% HYA600 50% PCR KWR102MC 5% Vistamaxx 3020 | 0.53 | 47.2 | 89.0 | 0.957 | 20.8 | 6.3 | 115000 |
| 108 | 45% HYA600 50% PCR KWR102MC 5% Vistamaxx 6102FL | 0.53 | 47.1 | 88.9 | 0.958 | 30.7 | 5.5 | 131000 |

TABLE 12

Blends with AL55-003 HDPE and 50 wt % PCR copolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 109 | 50% AL55-003 50% PCR KWR102MC | 0.46 | 49.8 | 108.3 | 0.959 | 10.3 | 4.9 | 162000 |
| 110 | 45% AL55-003 50% PCR KWR102MC 5% Enable 2703MC | 0.47 | 46.8 | 99.5 | 0.959 | 15.1 | 7.6 | 140000 |
| 111 | 45% AL55-003 50% PCR KWR102MC 5% Enable 2010CB | 0.49 | 48.4 | 98.8 | 0.959 | 29.7 | 4.7 | 140000 |
| 112 | 45% AL55-003 50% PCR KWR102MC 5% Enable 4002MC | 0.46 | 47.5 | 103.2 | 0.958 | 16.7 | 6.4 | 161000 |
| 113 | 45% AL55-003 50% PCR KWR102MC 5% Exceed XP 6026 ML | 0.45 | 45.3 | 100.6 | 0.958 | 28.6 | 6.0 | 142000 |
| 114 | 45%AL55-003 50% PCR KWR102MC 5% Exceed XP8358 | 0.45 | 44.6 | 99.0 | 0.958 | 35.3 | 8.1 | 133000 |
| 115 | 45% AL55-003 50% PCR KWR102MC 5% LLDPE LL 3201 | 0.52 | 48.9 | 93.9 | 0.957 | 16.1 | 6.0 | 136000 |
| 116 | 45% AL55-003 50% PCR KWR102MC 5% LD071.LR | 0.42 | 44.3 | 105.5 | 0.957 | 14.1 | 4.9 | 157000 |
| 117 | 45% AL55-003 50% PCR KWR102MC 5% Exact 5171 | 0.51 | 50.8 | 99.5 | 0.956 | 18.0 | 3.4 | 112000 |
| 118 | 45% AL55-003 50% PCR KWR102MC 5% Vistamaxx 3020 | 0.48 | 49.5 | 103.1 | 0.957 | 19.1 | 5.0 | 132000 |
| 119 | 45% AL55-003 50% PCR KWR102MC 5% Vistamaxx 6102FL | 0.53 | 52.0 | 98.2 | 0.957 | 40.0 | 4.0 | 144000 |

TABLE 13

Blends with SP5504 HDPE and 50 wt % PCR copolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 120 | 50% SP5504 50% PCR KWR102MC | 0.49 | 48.1 | 98.1 | 0.959 | 39.6 | 8.9 | 142000 |
| 121 | 45% SP5504 50% PCR KWR102MC 5% Enable 2703MC | 0.48 | 45.9 | 95.6 | 0.959 | 88.0 | 9.2 | 135000 |
| 122 | 45% SP5504 50% PCR KWR102MC 5% Enable 2010CB | 0.48 | 45.0 | 93.8 | 0.958 | 37.2 | 10.9 | 139000 |

TABLE 13-continued

Blends with SP5504 HDPE and 50 wt % PCR copolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 123 | 45% SP5504 50% PCR KWR102MC 5% Enable 4002MC | 0.49 | 47.1 | 96.1 | 0.959 | 39.7 | 12.6 | 145000 |
| 124 | 45% SP5504 50% PCR KWR102MC 5% Exceed XP 6026 ML | 0.46 | 44.1 | 95.8 | 0.958 | 65.3 | 13.5 | 138000 |
| 125 | 45% SP5504 50% PCR KWR102MC 5% Exceed XP8358 | 0.5 | 47.9 | 95.8 | 0.958 | 50.5 | 8.1 | 140000 |
| 126 | 45% SP5504 50% PCR KWR102MC 5% LLDPE LL 3201 | 0.51 | 47.2 | 92.5 | 0.957 | 32.6 | 9.6 | 155000 |
| 127 | 45% SP5504 50% PCR KWR102MC 5% LD 071.LR | 0.47 | 44.8 | 95.3 | 0.958 | 19.0 | 7.8 | 138000 |
| 128 | 45% SP5504 50% PCR KWR102MC 5% Exact 5171 | 0.48 | 46.8 | 97.4 | 0.956 | 37.8 | 6.5 | 129000 |
| 129 | 45% SP5504 50% PCR KWR102MC 5% Vistamaxx 3020 | 0.56 | 49.6 | 88.6 | 0.954 | 113.1 | 9.3 | 125000 |
| 130 | 45% SP5504 50% PCR KWR102MC 5% Vistamaxx 6102FL | 0.52 | 49.4 | 94.9 | 0.959 | 63.6 | 8.6 | 138000 |

TABLE 14

Blends with Marlex 5502BN HDPE, mLLDPE and 50 wt % PCR copolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 131 | 50% Marlex 5502BN 50% PCR KWR102MC | 0.48 | 46.3 | 96.5 | 0.958 | 20.9 | 5.8 | 142000 |
| 132 | 45% Marlex 5502BN 50% PCR KWR102MC 5% Enable 2703MC | 0.49 | 44.99 | 91.8 | 0.958 | 24.4 | 10.0 | 155000 |
| 133 | 45% Marlex 5502BN 50% PCR KWR102MC 5% Enable 2010CB | 0.51 | 44.36 | 87.0 | 0.957 | 26.9 | 9.0 | 156000 |
| 134 | 45% Marlex 5502BN 50% PCR KWR102MC 5% Enable 4002MC | 0.48 | 44.18 | 92.0 | 0.958 | 21.9 | 8.5 | 140000 |

TABLE 14-continued

Blends with Marlex 5502BN HDPE, mLLDPE and 50 wt % PCR copolymer

| Ex. | Recycled Resin Compositions | MI-2 g/10 min | MI-21 g/10 min | MIR | Density g/cm³ | ESCR_100% (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 135 | 45% Marlex 5502BN 50% PCR KWR102MC 5% Exceed XP 6026 ML | 0.46 | 42.86 | 93.2 | 0.957 | 53.7 | 9.3 | 137000 |
| 136 | 45% Marlex 5502BN 50% PCR KWR102MC 5% Exceed XP8358 | 0.48 | 42.99 | 89.6 | 0.957 | 47.3 | 7.1 | 156000 |
| 137 | 45% Marlex 5502BN 50% PCR KWR102MC 5% LLDPE LL 3201 | 0.51 | 45.02 | 88.3 | 0.958 | 37.4 | 6.6 | 156000 |
| 138 | 45% Marlex 5502BN 50% PCR KWR102MC 5% LD 071.LR | 0.48 | 47.91 | 99.8 | 0.957 | 12.8 | 5.9 | 136000 |
| 139 | 45% Marlex 5502BN 50% PCR KWR102MC 5% Exact 5171 | 0.54 | 46.36 | 85.9 | 0.955 | 22.5 | 5.8 | 126000 |
| 140 | 45% Marlex 5502BN 50% PCR KWR102MC 5% Vistamaxx 3020 | 0.53 | 48.26 | 91.1 | 0.955 | 39 | 5.7 | 127000 |
| 141 | 45% Marlex 5502BN 50% PCR KWR102MC 5% Vistamaxx 6102FL | 0.52 | 47.12 | 90.6 | 0.958 | 31.6 | 5.5 | 110000 |

TABLE 15

Blends of HD9830 HDPE, mLLDPE and 25 wt % PCR Copolymer

| Ex. | Recycled Resin Compositions | MI-2 g/10 min | MI-21 g/10 min | MIR | Density g/cm³ | ESCR_100 % (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 142 | 75% HD9830 25% KWR102MC PCR | 0.42 | 40.5 | 96.5 | 0.958 | 47.9 | 12.6 | 155000 |
| 143 | 70% HD9830 25% KWR102MC PCR 5% Enable 2703MC | 0.42 | 38.0 | 90.5 | 0.957 | 88.9 | 13.2 | 165000 |
| 144 | 70% HD9830 25% KWR102MC PCR 5% Enable 2010MCB | 0.44 | 39.2 | 89.1 | 0.956 | 75.9 | 10.1 | 166000 |
| 145 | 70% HD9830 25% KWR102MC PCR 5% Enable 4002MC | 0.42 | 38.1 | 90.8 | 0.957 | 84.6 | 11.1 | 164000 |
| 146 | 70% HD9830 25% KWR102MC PCR 5% Exceed XP 6026ML | 0.41 | 36.4 | 88.8 | 0.956 | 92.3 | 13.4 | 162000 |

TABLE 15-continued

Blends of HD9830 HDPE, mLLDPE and 25 wt % PCR Copolymer

| Ex. | Recycled Resin Compositions | MI-2 g/10 min | MI-21 g/10 min | MIR | Density g/cm³ | ESCR_100 % (hrs) | NCLS (10% Igepal, 50 C., 600 psi) (hrs) | Flex @ 0.05 in/min (ASTM D790, Proc A) 1% Secant Modulus (psi) |
|---|---|---|---|---|---|---|---|---|
| 147 | 70% HD9830 25% KWR102MC PCR 5% Enable 2703MC | 0.40 | 38.0 | 94.9 | 0.956 | 65.1 | 17.1 | 153000 |
| 148 | 70% HD9830 25% KWR102MC PCR 5% Enable 2010CB | 0.46 | 39.4 | 85.7 | 0.957 | 159.4 | 14.9 | 147000 |
| 149 | 70% HD9830 25% KWR102MC PCR 5% Enable 4002MC | 0.41 | 37.9 | 92.4 | 0.957 | 107.4 | 13.8 | 160000 |
| 150 | 70% HD9830 25% KWR102MC PCR 5% Exceed XP 6026ML | 0.38 | 37.0 | 97.3 | 0.957 | 255.1 | 15.8 | 157000 |
| 151 | 70% HD9830 25% KWR102MC PCR 5% Vistamaxx 3020 | 0.43 | 40.7 | 94.6 | 0.953 | 86.1 | 9.8 | 145000 |
| 152 | 70% HD9830 25% KWR102MC PCR 5% Vistamaxx 6102FL | 0.44 | 40.3 | 91.6 | 0.953 | 89.2 | 9.2 | 149000 |
| 153 | 70% HD9830 25% KWR102MC PCR 5% Vistamaxx 3020 | 0.44 | 40.7 | 92.5 | 0.953 | 84.4 | 13.0 | 138000 |
| 154 | 70% HD9830 25% KWR102MC PCR 5% Vistamaxx 6102FL | 0.44 | 40.8 | 92.7 | 0.953 | 260.5 | 10.3 | 141000 |

TABLE 16

Additional blends of BOCD-mLLDPE920 with HDPE and PCR Copolymer

| Ex. | | MI-2 g/10 min | MI-21 g/10 min | MIR | Density g/cm³ | ESCR (hours) | NCLS (horns) | Flex @ 0.05 in/min (ASTM D790, Proc A) 1% Secant Modulus (psi) |
|---|---|---|---|---|---|---|---|---|
| 155 | 70% 5502BN 25% PCR Copolymer 5% BOCD-mLLDPE920 | 0.46 | 39.6 | 86.8 | 0.954 | 50.5 | 6.6 | 152000 |
| 156 | 70% HYA600 25% PCR Copolymer 5% BOCD-mLLDPE920 | 0.45 | 34.4 | 76.6 | 0.954 | 56.6 | 7.6 | 147000 |
| 157 | 70% AL55-003 25% PCR Copolymer 5% BOCD-mLLDPE920 | 0.46 | 41.5 | 89.4 | 0.953 | 39.0 | 4.4 | 151000 |

Figure 2:
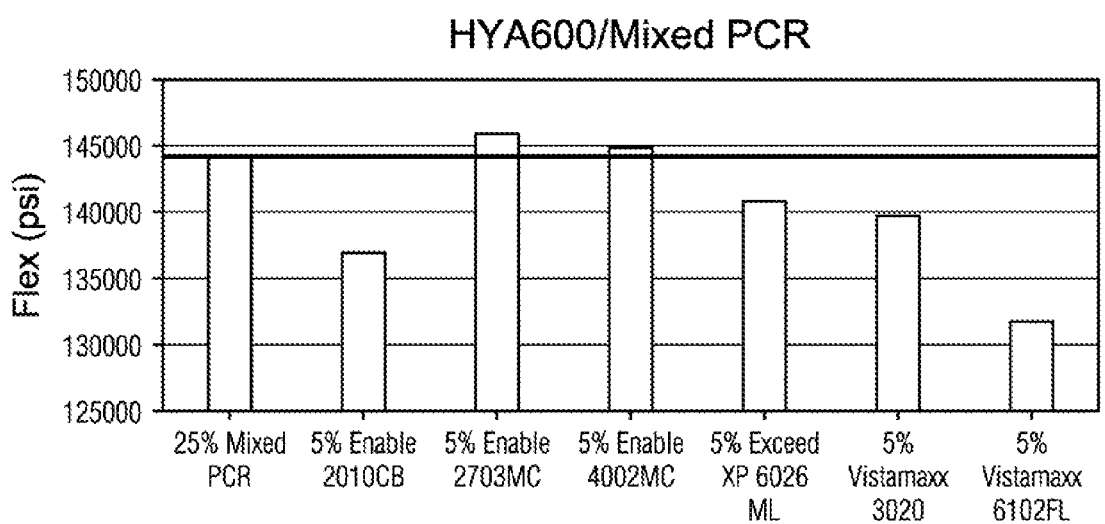
FIG. 2 shows the effect of 5 wt % mLLDPE on Flex Modulus (1% Secant) added to a recycled resin, according to one or more embodiments provided herein.
Figure 3:
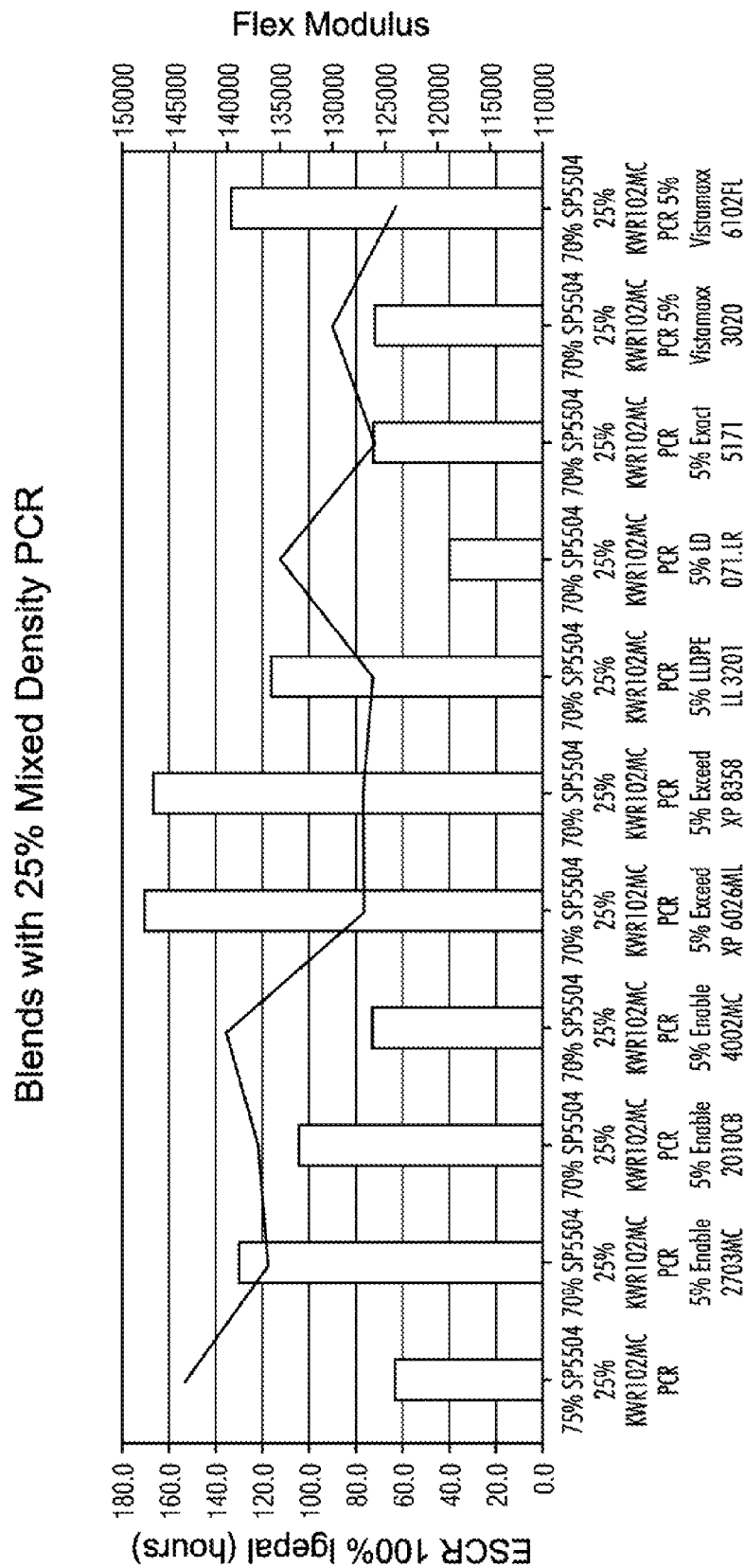
FIG. 3 shows the boost in ESCR with minimum decreases in stiffness due to the addition of a metallocene catalyzed polyethylene added to a recycled resin, according to one or more embodiments provided herein.

FIG. 1 shows the effect of 5 wt % mLLDPE on stress crack resistance (NCLS) (10% Igepal, 50 C, 600 psi). FIG. 2 shows the effect of 5 wt % mLLDPE on Flex Modulus (1% Secant Modulus (psi) ("1% Secant") or Flex @ 0.05 in/min (ASTM D790, Proc A). FIG. 3 shows the boost 5 wt % mLLDPE has on ESCR (10% Igepal, Cond B (ASTM D1693)) with minimum decreases in stiffness (as measured by Flex Modulus) due to the addition of a metallocene polyethylene, as described herein. Numerical values of these same properties are reported in Tables 2-16 along with 12 (MI, or MI-2), 121 (HLMI, or MI-21), and melt index ratio (MIR, $I_{21}/I_2$), and density.

As shown in FIGS. 1-3 and Tables 2-16, the addition of 5 wt % of a metallocene catalyzed linear low density polyethylene (mLLDPE) significantly improved stress crack resistance and impact properties with minimal loss of stiffness. In some cases, the stress crack resistance, as measured by ESCR, increased by at least 200% (See, Table 3. Ex. 15 (70% Marlex 5502BN 25% KWR102MC PCR 5% Enable 4002MC). In some cases, the NCLS increased by at least 55% (See, Table 5. Ex 41 (70% AL55-003 25% PCR KWR102MC 5% Exceed XP 6026 ML).

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having the benefit of this disclosure, will appreciate that other embodiments can be devised which do not depart from the scope and spirit of the present disclosure.

We claim:

1. A recycled resin composition, comprising:
   at least one recycled resin;
   up to about 45 wt %, based on the total weight of the composition, of a virgin HDPE containing at least 99 wt % of ethylene derived units and having a density of about 0.945 g/cm$^3$ to about 0.970 g/cm$^3$ and a MI$_2$ of about 0.1 to about 1.5 g/10 min, as measured by ASTM D1238 (190° C., 2.16 kg load); and
   greater than 0 wt % and up to about 10 wt %, based on the total weight of the composition, of at least one metallocene catalyzed linear low density polyethylene (mLLDPE) modifier, wherein the mLLDPE modifier comprises one or more of the following:
   (i) a first mLLDPE of 80 wt % to 98 wt % ethylene and 2 wt % to 20 wt % of one or more C3-C12 alpha olefins and having a density of about 0.900 g/cm$^3$ to about 0.945 g/cm$^3$, molecular weight distribution (MWD, defined as Mw/Mn) of about 3.0 to 4.5, CDBI of 60% to 99%, and one or more of the following properties:
      a. a melt index ratio (MIR) within the range from 25 to 40, wherein MIR is the ratio of high load melt index (HLMI, ASTM D1238 at 190° C., 21.6 kg) to melt index (MI, ASTM D1238 at 190° C., 2.16 kg);
      b. an inflection point in a Van Gurp Palmen plot of phase angle vs. complex modulus (Pa) of the polyethylene copolymer; and
      c. a shear thinning ratio less than 15;
   (ii) a second mLLDPE of 80-98 wt % ethylene and 2-20 wt % of one or more C3-C12 alpha olefins and having a density of about 0.900 g/cm$^3$ to about 0.940 g/cm$^3$, MWD of 2 to 4.5, CDBI of 15% to 40%, and a broad orthogonal composition distribution; and
   (iii) a third mLLDPE of 80-98 wt % ethylene and 2-20 wt % of one or more C3-C12 alpha olefins and having a density of about 0.900 g/cm$^3$ to about 0.940 g/cm$^3$, MWD of 6 to 10, CDBI of 15 to 40%, and a broad orthogonal composition distribution;
   further wherein the recycled resin composition has one or more of the following properties: a flex modulus @ 0.05 in/min of 110,000 psi to 180,000 psi, as measured by ASTM D790, Proc. A 1% Secant Modulus and an ESCR, as measured by 100% Igepal Cond B, ASTM D1693, of about 10 hr to about 75 hr.

2. The composition of claim 1, wherein the at least one recycled resin is an ethylene copolymer having a MI$_2$ of 0.2 g/10 min to 1.2 g/10 min and density of 0.953 g/cm$^3$ to 0.965 g/cm$^3$.

3. The composition of claim 1, wherein the at least one recycled resin is an ethylene homopolymer having a MI$_2$ of 0.15 g/10 min to 1.15 g/10 min and density of 0.954 g/cm$^3$ to 0.966 g/cm$^3$.

4. The composition of claim 1, wherein the recycled resin is at least 50 wt % of the total weight of the recycled resin composition.

5. The composition of claim 4, wherein the recycled resin is at least 75 wt % of the total weight of the recycled resin composition.

6. The composition of claim 1, wherein the at least one metallocene catalyzed linear low density polyethylene (mLLDPE) is about 5 wt % or less of the total weight of the recycled resin composition.

7. The composition of claim 1, wherein the flex modulus of the recycled resin blend is about 120,000 psi to about 175,000 psi.

8. The composition of claim 7, wherein the flex modulus of the recycled resin blend is about 135,000 psi to about 175,000 psi.

9. The composition of claim 1, wherein the ESCR of the recycled resin blend is about 15 hours to about 70 hours.

10. The composition of claim 9, wherein the ESCR of the recycled resin blend is about 20 hours to about 70 hours.

* * * * *